United States Patent
Endo

(10) Patent No.: US 12,393,989 B2
(45) Date of Patent: Aug. 19, 2025

(54) METHOD OF MANAGING ELECTRICALLY POWERED VEHICLE AND SYSTEM THAT MANAGES ELECTRICALLY POWERED VEHICLE, AND COMPUTER APPARATUS

(71) Applicant: TOYOTA JIDOSHA KABUSHIKI KAISHA, Toyota (JP)

(72) Inventor: Yoshihiko Endo, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 77 days.

(21) Appl. No.: 18/492,090

(22) Filed: Oct. 23, 2023

(65) Prior Publication Data
US 2024/0169444 A1    May 23, 2024

(30) Foreign Application Priority Data
Nov. 18, 2022   (JP) .................................. 2022-184755

(51) Int. Cl.
*G06Q 40/08* (2012.01)
*B60L 58/12* (2019.01)
*B60L 58/16* (2019.01)
*G06Q 30/0283* (2023.01)
*G06Q 30/0645* (2023.01)

(52) U.S. Cl.
CPC .............. *G06Q 40/08* (2013.01); *B60L 58/12* (2019.02); *B60L 58/16* (2019.02); *G06Q 30/0283* (2013.01); *G06Q 30/0645* (2013.01); *B60L 2240/14* (2013.01); *B60L 2240/545* (2013.01); *B60L 2240/549* (2013.01)

(58) Field of Classification Search
CPC .............. G06Q 40/08; G06Q 30/0283; G06Q 30/0645; B60L 58/12; B60L 58/16
See application file for complete search history.

(56) References Cited

U.S. PATENT DOCUMENTS

| | | | |
|---|---|---|---|
| 10,994,727 B1 * | 5/2021 | Kumar | G08G 1/0129 |
| 2018/0075309 A1 * | 3/2018 | Sathyanarayana | G05D 1/0088 |
| 2019/0207267 A1 * | 7/2019 | Vickery | B60L 53/80 |
| 2020/0090425 A1 * | 3/2020 | Senft-Grupp | G01R 31/3648 |
| 2020/0334722 A1 | 10/2020 | Kurimoto et al. | |
| 2021/0335060 A1 * | 10/2021 | Bauer | G07C 5/0816 |
| 2022/0301067 A1 * | 9/2022 | Noda | G06Q 40/08 |
| 2022/0318865 A1 * | 10/2022 | Watanabe | G06Q 30/04 |

FOREIGN PATENT DOCUMENTS

JP    2020177652 A    10/2020

\* cited by examiner

*Primary Examiner* — Scott C Anderson
(74) *Attorney, Agent, or Firm* — Dickinson Wright, PLLC

(57) ABSTRACT

A method of managing an electrically powered vehicle includes obtaining, for an electrically powered vehicle configured to travel with electric power from a battery, battery data representing a state of a battery detected by a sensor provided in the battery, assessing an accident risk of the electrically powered vehicle based on the battery data during travel of the electrically powered vehicle, and providing a prescribed service (for example, an insurance service and a lease service) based on a result of assessment of the accident risk.

10 Claims, 10 Drawing Sheets

| VEHICLE ID | FORM OF USE | BATTERY | ACCIDENT RISK | DETERIORATION RISK | FEE |
|---|---|---|---|---|---|
| BID-1 | PARTIAL LEASE | BATTERY DATA | ACCIDENT FACTOR DATA | DETERIORATION FACTOR DATA | INSURANCE FEE, LEASE FEE, ... |
| BID-2 | FULL LEASE | ... | ... | ... | ... |
| BID-3 | SOLD VEHICLE | ... | ... | ... | ... |
| BID-4 | PARTIAL LEASE | ... | ... | ... | ... |
| ... | ... | ... | ... | ... | ... |

《VEHICLE INFORMATION》

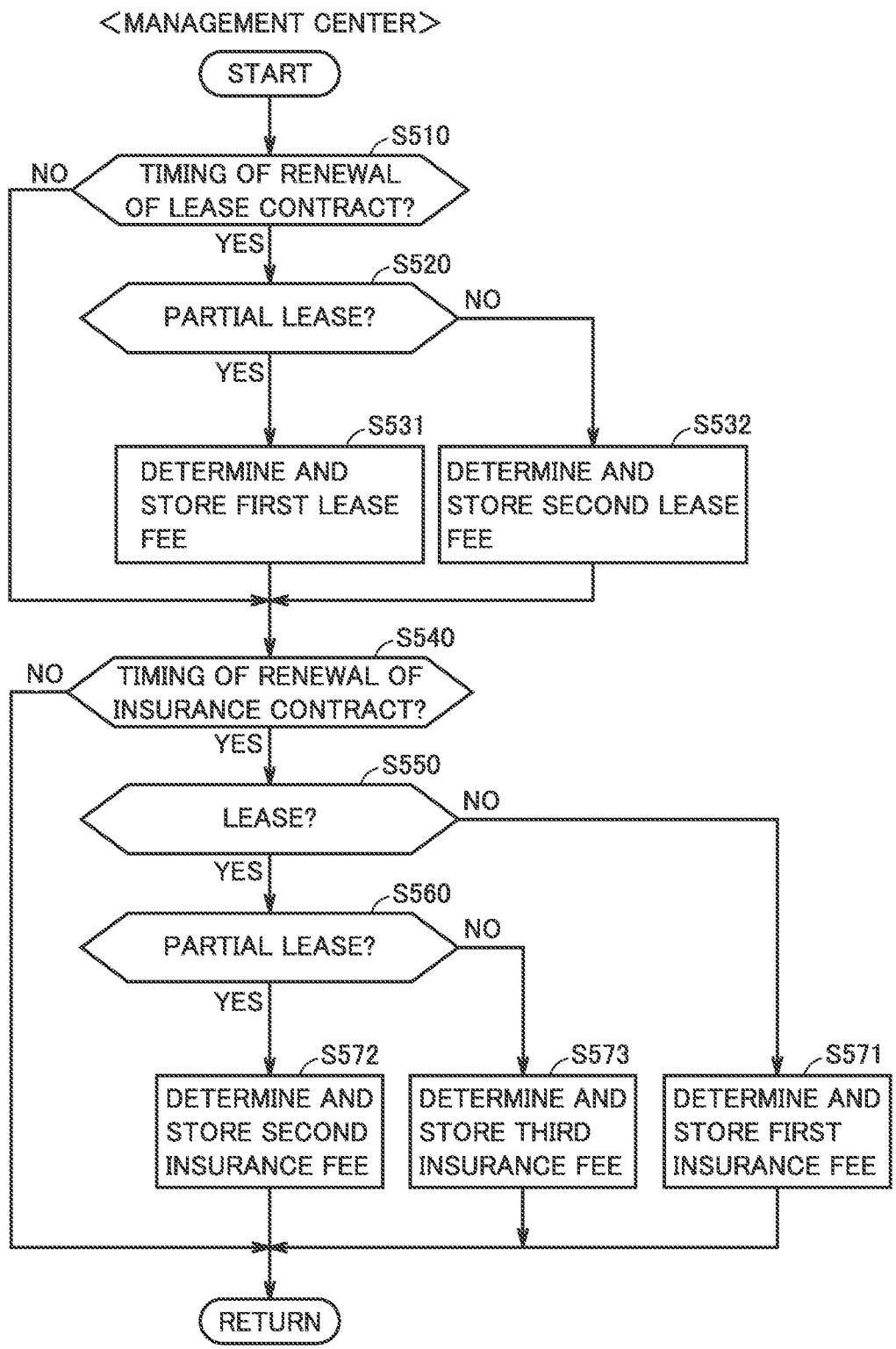

METHOD OF MANAGING ELECTRICALLY POWERED VEHICLE AND SYSTEM THAT MANAGES ELECTRICALLY POWERED VEHICLE, AND COMPUTER APPARATUS

CROSS REFERENCE TO RELATED APPLICATIONS

This nonprovisional application is based on Japanese Patent Application No. 2022-184755 filed with the Japan Patent Office on Nov. 18, 2022, the entire contents of which are hereby incorporated by reference.

BACKGROUND

Field

The present disclosure relates to a method of managing an electrically powered vehicle, a system that manages an electrically powered vehicle, and a computer apparatus.

Description of the Background Art

Japanese Patent Laying-Open No. 2020-177652 discloses such a technique that a server that manages a rental fee paid by a user for rental of a battery for travel mounted on a vehicle collects a full charge capacity of a battery from the vehicle and lowers the rental fee as the collected full charge capacity decreases.

SUMMARY

A system in which a server obtains from a vehicle, vehicle behavior data (a position, a steering angle, a vehicle speed, or the like) that represents a behavior during travel of the vehicle, assesses an accident risk of the vehicle based on the vehicle behavior data, and provides a prescribed service (for example, advice about safe drive) to a vehicle user based on a result of assessment has recently been proposed.

In the system, however, the server obtains the vehicle behavior data through wireless communication with the traveling vehicle. Therefore, the vehicle that can have the service may disadvantageously be limited to a vehicle (connected car) capable of wirelessly communicating with the server.

The present disclosure was made to solve the problem above, and an object thereof is to facilitate provision of a service in accordance with an accident risk.

According to a form according to a first point of view of the present disclosure, a method of managing an electrically powered vehicle shown below is provided.

(Clause 1) The method of managing an electrically powered vehicle includes obtaining, for an electrically powered vehicle configured to travel with electric power from a battery, battery data representing a state of the battery detected by a sensor provided in the battery, assessing an accident risk of the electrically powered vehicle based on the battery data during travel of the electrically powered vehicle, and providing a prescribed service based on a result of assessment of the accident risk.

In the electrically powered vehicle configured to travel with electric power from the battery, battery data (that is, a state of the battery detected by the sensor provided in the battery) during travel tends to represent a behavior of the vehicle during travel. The battery data accumulated in the electrically powered vehicle can be drawn up by electric vehicle supply equipment (EVSE) from the electrically powered vehicle. Therefore, the electrically powered vehicle can send the battery data to the outside without establishing wireless communication. In the method, the accident risk of the electrically powered vehicle is assessed based on the battery data during travel. Therefore, the electrically powered vehicle can receive the service in accordance with the accident risk, regardless of whether or not it is equipped with a connected function (a wireless data communication function during travel). Provision of a service in accordance with the assessed accident risk (that is, a result of assessment in connection with safe drive) is thus facilitated. Without being limited to a luxury car equipped with the connected function, the service can fairly be provided also to an inexpensive car without the connected function.

The accident risk represents possibility that a vehicle is involved in an accident in the future. The sensor provided in the battery may include at least one of a current sensor, a voltage sensor, and a temperature sensor. Examples of the electrically powered vehicle (xEV) include a battery electric vehicle (BEV), a hybrid electric vehicle (HEV), a plug-in hybrid electric vehicle (PHEV), and a fuel cell electric vehicle (FCEV).

The method of managing an electrically powered vehicle according to Clause 1 may be configured according to any one of Clauses 2 to 8 shown below.

(Clause 2) The method according to Clause 1 further includes a feature below. The battery data includes data on a temperature of the battery detected by the sensor. The assessing an accident risk includes assessing the accident risk as being lower as a period during which the temperature of the battery exceeds a reference value is shorter during travel of the electrically powered vehicle.

A length of the period during which the temperature of a drive battery exceeds the reference value during travel of the electrically powered vehicle tends to correlate with a frequency of an acceleration and deceleration operation onto a subject vehicle during travel. The method thus facilitates appropriate assessment of the accident risk.

(Clause 3) The method according to Clause 1 or 2 further includes a feature below. The battery data includes data on a current in the battery detected by the sensor. The assessing an accident risk includes obtaining a frequency of hard braking of the electrically powered vehicle based on a rate of a charging current in the battery during travel of the electrically powered vehicle and assessing the accident risk as being lower as the obtained frequency of the hard braking is lower.

The rate of the charging current in the drive battery during travel of the electrically powered vehicle tends to correlate with the frequency of hard braking (the number of times of hard braking per unit period) of the electrically powered vehicle. The accident risk of the vehicle tends to be lower as the frequency of hard braking in the vehicle is lower. The method thus facilitates appropriate assessment of the accident risk of the electrically powered vehicle.

(Clause 4) The method according to any one of Clauses 1 to 3 further includes a feature below. The battery data includes data on a current in the battery detected by the sensor. The assessing an accident risk includes obtaining a frequency of acceleration and deceleration of the electrically powered vehicle based on an amount of the current in the battery during travel of the electrically powered vehicle and assessing the accident risk as being lower as the obtained frequency of the acceleration and deceleration is lower.

The amount of the current in the drive battery during travel of the electrically powered vehicle tends to correlate with the frequency of acceleration and deceleration (the number of times of acceleration and deceleration per unit period) of the electrically powered vehicle. The method thus facilitates appropriate assessment of the accident risk of the electrically powered vehicle.

(Clause 5) The method according to any one of Clauses 1 to 4 further includes a feature below. The prescribed service includes an insurance service relating to replacement of the battery. The providing a prescribed service includes assessing a deterioration risk of the battery based on the battery data and determining an insurance fee for a user of the electrically powered vehicle to receive the insurance service. The determining an insurance fee includes determining the insurance fee for a period of coverage by the insurance service based on the accident risk and the deterioration risk assessed based on the battery data during an assessment period set before the period of coverage.

The battery mounted on the electrically powered vehicle fails due to an accident, or is deteriorated by being used. The battery that is no longer able to exhibit sufficient performance due to failure or deterioration may be replaced. The insurance service facilitates replacement of the battery when the battery mounted on the electrically powered vehicle should be replaced. Under the insurance service, a substitute power storage may be provided to a vehicle user, for example, at no charge (or only with a prescribed commission fee). According to the method, the accident risk of the electrically powered vehicle and the deterioration risk of the battery can appropriately be assessed based on the battery data (that is, a state of the battery detected by the sensor provided in the battery). Since the method does not require the vehicle behavior data, the insurance service in accordance with the accident risk of the electrically powered vehicle and the deterioration risk of the battery can be provided with a small amount of data. In addition, setting of an appropriate insurance fee can be facilitated by varying the insurance fee in accordance with the accident risk and the deterioration risk.

(Clause 6) The method according to Clause 5 further includes a feature below. The prescribed service further includes a lease service for rental of the battery. The providing a prescribed service includes obtaining a capacity retention rate of the battery based on the battery data and determining a lease fee of the battery for the period of coverage based on the capacity retention rate of the battery and the insurance fee for the period of coverage.

The method provides the lease service in addition to the insurance service. The value of the battery tends to be higher as the capacity retention rate of the battery is higher. The method facilitates proper determination of the lease fee of the battery based on the capacity retention rate corresponding to the value of the battery and the insurance fee corresponding to the accident risk and the deterioration risk.

(Clause 7) The method according to Clause 6 further includes a feature below. The method of managing an electrically powered vehicle further includes encouraging the user of the electrically powered vehicle to replace the battery under the insurance service when the capacity retention rate of the battery becomes equal to or lower than a prescribed threshold value.

According to the method, when the capacity retention rate of the battery mounted on the electrically powered vehicle lowers, the user is encouraged to replace the battery. Therefore, the user replaces the battery each time the capacity retention rate of the battery lowers, and use of the electrically powered vehicle over a long period can be facilitated.

(Clause 8) The method according to any one of Clauses 1 to 7 further includes a feature below. The prescribed service includes a lease service for rental of the battery and an insurance service that compensates for a damage associated with an accident of the electrically powered vehicle. The providing a prescribed service includes assessing a value of the battery based on the battery data, determining a lease fee for a user of the electrically powered vehicle to receive the lease service based on the value of the battery, and determining an insurance fee for the user of the electrically powered vehicle to receive the insurance service based on the accident risk of the electrically powered vehicle.

According to the configuration, proper determination of the lease fee and the insurance fee is facilitated.

According to one form, a program that causes a computer to perform the method of managing an electrically powered vehicle according to any one of Clauses 1 to 8 is provided. In another form, a computer apparatus that distributes the program is provided.

According to a form according to a second point of view of the present disclosure, a computer apparatus shown below is provided.

(Clause 9) The computer apparatus includes a processor and a storage where a program causing the processor to perform the method of managing an electrically powered vehicle according to any one of Clauses 1 to 8 is stored.

According to the computer apparatus, the method of managing an electrically powered vehicle described previously is suitably performed.

According to a form according to a third point of view of the present disclosure, a system that manages an electrically powered vehicle shown below is provided.

(Clause 10) The system that manages an electrically powered vehicle includes an electrically powered vehicle configured to travel with electric power from a battery, a power feed facility that feeds electric power to the electrically powered vehicle, and the computer apparatus according to Clause 9. The computer apparatus is configured to perform, for the electrically powered vehicle, the method of managing an electrically powered vehicle according to any one of Clauses 1 to 8. The electrically powered vehicle is configured to transmit the battery data recorded during travel of the electrically powered vehicle to the computer apparatus by communicating with the computer apparatus through the power feed facility while the electrically powered vehicle is connected to the power feed facility.

According to the system, the method of managing an electrically powered vehicle described previously is suitably performed.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 10 is a flowchart showing a modification of the processing shown in FIG. 5.

DESCRIPTION OF THE PREFERRED EMBODIMENTS

Figure 1:
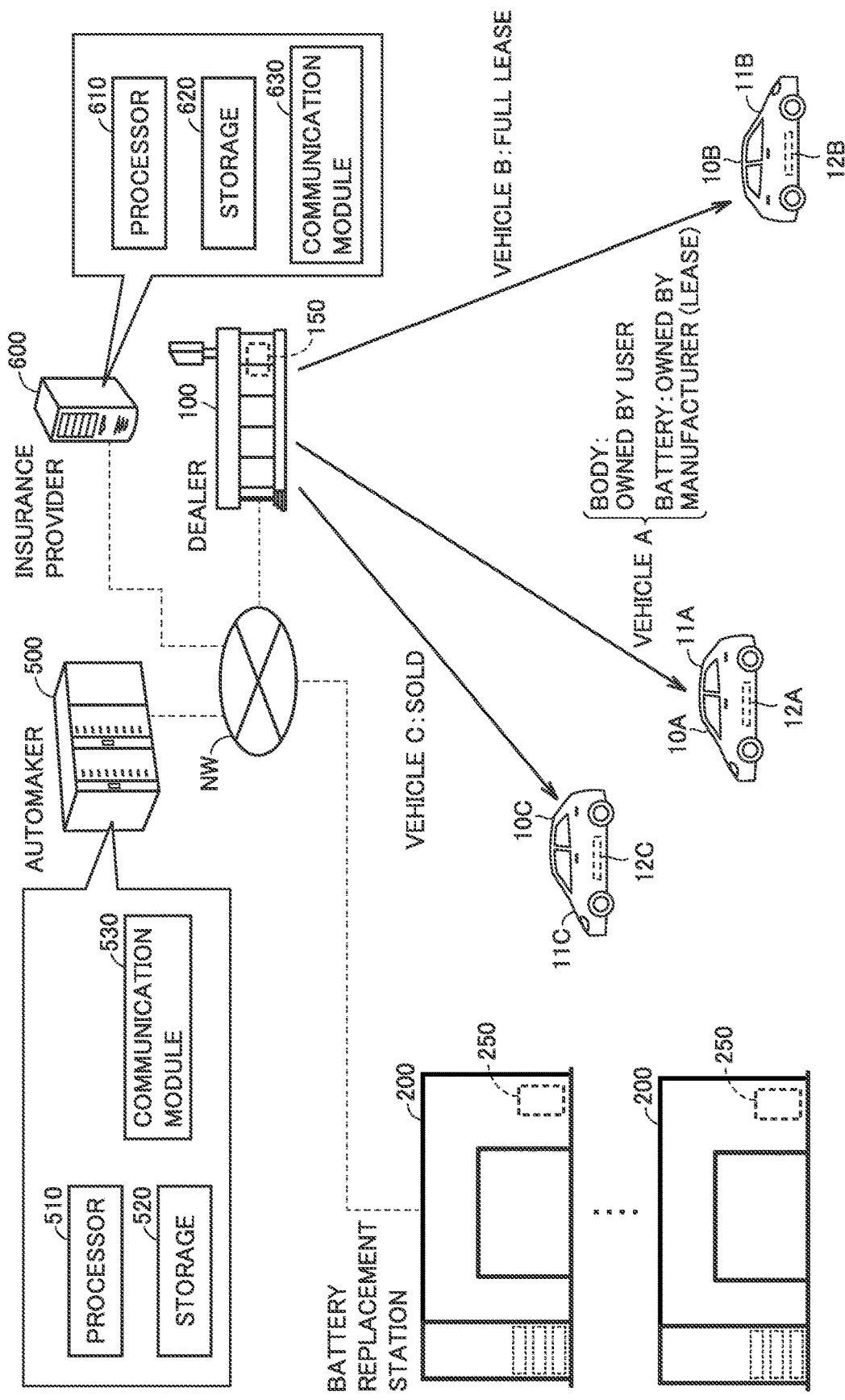
FIG. 1 is a diagram for illustrating overview of a system that manages an electrically powered vehicle according to an embodiment of the present disclosure.

An embodiment of the present disclosure will be described in detail with reference to the drawings. The same or corresponding elements in the drawings have the same reference characters allotted and description thereof will not be repeated.

FIG. 1 is a diagram for illustrating overview of a system that manages an electrically powered vehicle according to this embodiment. The management system shown in FIG. 1 includes a dealer 100, a battery replacement station (which is denoted as "BSta" below) 200, a management center 500, and an insurance server 600.

Management center 500 is a server that provides a lease service relating to a car. Management center 500 manages information on the lease service. Management center 500 belongs, for example, to an automaker. In this embodiment, the automaker also serves as a leasing company. Insurance server 600 is a server that provides an insurance service. Insurance server 600 manages information on the insurance service. Insurance server 600 belongs, for example, to an insurance provider. Insurance server 600 is in coordination with management center 500 to provide the insurance service relating to a battery rented under the lease service.

The insurance service refers to an insurance service relating to replacement of the battery, and more particularly to a service for exemption of at least a part of compensation liability of a user who has caused deterioration or failure of a rented battery. An insurance relating to such replacement of a battery is also referred to as a "battery insurance" below. In this embodiment, the user is covered by the battery insurance, so that the entire compensation liability of the user for an owner (the leasing company) of the battery is exempted. More specifically, the user can be provided with a substitute battery at no charge under coverage by the battery insurance when the user has caused deterioration or failure of the rented battery. The user can detach the deteriorated or failed battery from the vehicle, for example, at BSta 200, and attach a new battery (a less deteriorated battery) provided by BSta 200 to the vehicle. The user who purchased the battery insurance, however, is not always covered by the battery insurance. The user who purchased the battery insurance can be covered by the battery insurance only when the user satisfies a prescribed replacement requirement. The replacement requirement will be described later (see S410 in FIG. 7).

In the lease service, a plurality of lease types including a partial lease type and a full lease type are adopted. The partial lease type refers to a lease type for rental only of a battery (more specifically, a drive battery). A user who rents the battery in accordance with the partial lease type prepares by the user himself/herself, a portion (body portion) of the vehicle except for the battery. The user can mount the battery rented from the leasing company on the body owned by the user himself/herself. As the battery is mounted on the body, the xEV can travel. When a partial lease contract is terminated, the user returns only the battery to the leasing company. The full lease type, on the other hand, refers to a lease type for rental of the entire vehicle (that is, both of a body portion and a battery). When a full lease contract is terminated, the user returns not only the battery but also the entire vehicle to the leasing company.

Dealer 100 includes a server 150. The automaker sells or leases vehicles through dealer 100. Dealer 100 not only sells vehicles manufactured by the automaker but also provides the lease service described previously. Server 150 manages information (vehicle information) on a vehicle sold or leased by dealer 100, as being distinguished based on a vehicle ID. In response to a request from management center 500 or each time vehicle information is updated, server 150 transmits latest vehicle information to management center 500. Dealer 100 rents at least one of the body and the battery provided by the automaker. Dealer 100 may rent a battery 12A of a vehicle 10A shown in FIG. 1 to a user, for example, in accordance with the partial lease type. In this case, vehicle 10A corresponds to a partial lease vehicle (which may be denoted as a "vehicle A" below) and a body 11A of vehicle 10A is a property of the user. Battery 12A of vehicle 10A is provided to the user by lease and it is a property of the automaker. Alternatively, dealer 100 may rent a vehicle 10B shown in FIG. 1 to a user, for example, in accordance with the full lease type. In this case, vehicle 10B corresponds to a full lease vehicle (which may be denoted as a "vehicle B" below). The entire vehicle 10B (a body 11B and a battery 12B) is provided to the user by lease and it is a property of the automaker. Alternatively, for example, dealer 100 may sell a vehicle 10C shown in FIG. 1 to a user. In this case, vehicle 10C corresponds to a sold vehicle (which may be denoted as a "vehicle C" below). The entire vehicle 10C (a body 11C and a battery 12C) is sold to the user and it is a property of the user.

In this embodiment, insurance server 600 provides an insurance service relating to repair of the body in addition to the insurance service relating to replacement of the power storage described previously. The insurance service relating to repair of the body is a service to exempt at least a part of compensation liability of the user who has caused damage or failure of the rented body. Such an insurance relating to repair of the body is also referred to as a "body insurance" below. In this embodiment, the user of vehicle A purchases the battery insurance but does not purchase the body insurance. The user of vehicle B purchases both of the battery insurance and the body insurance. Since the battery insurance and the body insurance are insurances directed to lease, the user of the sold vehicle (vehicle C) purchases neither of the battery insurance and the body insurance.

In this embodiment, an insurance fee for an insurance for lease is included in a lease fee. A vehicle user who has made a lease contract with a leasing company can receive the lease service and the insurance service described previously for a prescribed unit period by paying a lease fee for the unit period. Though details will be described later, management center 500 determines the lease fee for each unit period in this embodiment (see FIG. 5). A period for which the fee for reception of the service is paid corresponds to a service period. The service period common to the lease service and the insurance service is referred to as a "lease period" below. In this embodiment, a length (unit period) of the lease period is set to one month.

BSta 200 is configured to replace a battery for a vehicle (for example, for an xEV). BSta 200 includes a server 250. The system that manages the electrically powered vehicle according to this embodiment includes a plurality of BSta's 200. These BSta's 200 are provided at points within an area under management by the management system so as to construct a network of battery replacement points that cover the entire area under management thereby. Each BSta 200 may function as a vehicle repair factory. Each BSta may be configured to repair the body. Though only a single dealer 100 is shown in FIG. 1, the management system may include a plurality of dealers 100. These dealers 100 may be provided at points within the area under management by the management system so as to construct a network of sales/lease points that covers the entire area under management thereby. Dealer 100 and BSta 200 may be provided at the same location (or nearby).

Management center 500 includes a processor 510, a storage 520, and a communication module 530. Insurance server 600 includes a processor 610, a storage 620, and a communication module 630. Each of processors 510 and 610 includes, for example, a central processing unit (CPU). Each of storages 520 and 620 is configured such that information put thereinto can be stored therein. Each of storages 520 and 620 may include a hard disk (HD) drive or a solid state drive (SSD). Each of communication modules 530 and 630 is connected to a communication network NW, for example, through a wire. Each of server 150 and server 250 is also connected to communication network NW, for example, through a wire. Management center 500, insurance server 600, server 150, and server 250 are configured to communicate with one another over communication network NW. Communication network NW is a wide range network constructed, for example, of the Internet and a wireless base station. Communication network NW may include a cellular network.

Figure 2:
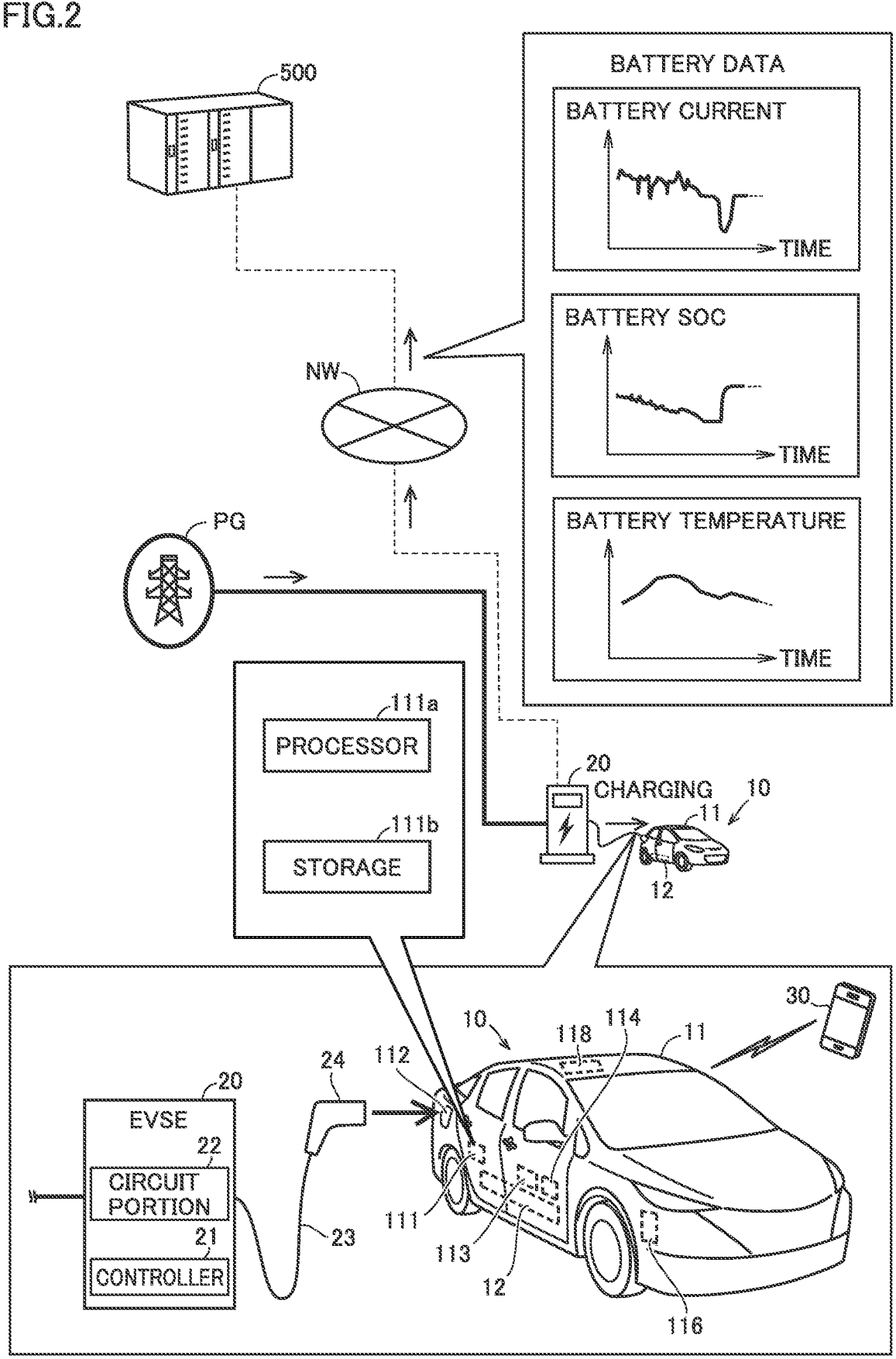
FIG. 2 is a diagram for illustrating a configuration of the electrically powered vehicle shown in FIG. 1.

A vehicle provided by dealer 100 may be referred to as a "vehicle 10" below. Vehicle 10 according to this embodiment is any of vehicles A, B, and C shown in FIG. 1. FIG. 2 is a diagram for illustrating a configuration of vehicle 10.

Referring to FIG. 2, vehicle 10 includes a body 11 and a battery 12 mounted on body 11. Vehicle 10 is configured to travel with electric power in battery 12. Vehicle 10 is, for example, a BEV not provided with an internal combustion engine. A known power storage for a vehicle (for example, a liquid secondary battery or an all-solid-state secondary battery) can be adopted as battery 12. Examples of the secondary battery for the vehicle include a lithium ion battery and a nickel metal hydride battery. A plurality of secondary batteries may form a battery pack.

Body 11 includes an ECU 111, an inlet 112, a charger 113, a battery management system (BMS) 114, a drive apparatus 116, and a communication apparatus 118. Body 11 further includes a not-shown human machine interface (HMI). ECU 111 includes a processor 111*l* and a storage 111*b*. A program executed by processor 111*l* is stored in storage 111*b*. The ECU means an electronic control unit. A control system (including ECU 111) for vehicle 10 is supplied with electric power from a not-shown auxiliary battery.

EVSE means electric vehicle supply equipment. EVSE 20 is configured to feed electric power to an electrically powered vehicle. A main body of EVSE 20 contains a controller 21 and a circuit portion 22. EVSE 20 further includes a charging cable 23 that extends outward from the main body of EVSE 20. EVSE 20 outputs, for example, alternating-current (AC) power. Without being limited thereto, EVSE 20 may output direct-current (DC) power.

Charging cable 23 includes a connector 24 at a tip end thereof and contains a communication line and a power line. The communication line in charging cable 23 is electrically connected to controller 21. Controller 21 includes a processor, a storage, and a communication module, and it is connected to communication network NW, for example, through a wire. Controller 21 is configured to communicate with management center 500. The power line in charging cable 23 is electrically connected to circuit portion 22. Circuit portion 22 includes a circuit for power feed to vehicle 10 and it is electrically connected to a power grid PG. Power grid PG is a power network constructed by a power transmission and distribution facility. Power grid PG may be a commercial power supply.

Inlet 112 is constructed such that connector 24 (a tip end portion) of charging cable 23 is attachable thereto and removable therefrom. As connector 24 of charging cable 23 connected to the main body of EVSE 20 is connected to inlet 112 of vehicle 10 in a parked state, vehicle 10 enters a state electrically connected to EVSE 20 (a plugged-in state). For example, during travel of vehicle 10, on the other hand, vehicle 10 is in a state not electrically connected to EVSE 20 (a plugged-out state). EVSE 20 further includes a connection detection circuit (not shown) that detects a state (plugged-in state/plugged-out state) of connector 24.

EVSE 20 and power grid PG are electrically connected to each other. Therefore, vehicle 10 in the plugged-in state is electrically connected to power grid PG. When vehicle 10 in the plugged-in state carries out external charging (charging of battery 12 with electric power from the outside of the vehicle), electric power supplied from power grid PG is outputted through circuit portion 22 of EVSE 20 to connector 24 and then inputted to inlet 112. Charger 113 then generates charging power in accordance with an instruction from ECU 111 with electric power supplied from inlet 112 and provides generated charging power to battery 12. Charger 113 includes a power conversion circuit (for example, at least one of a DC/DC conversion circuit and an AC/DC conversion circuit), and generates charging power with the use of such a circuit. The configuration of vehicle 10 may be modified to carry out external power feed (power feed from battery 12 to the outside of the vehicle). For example, charger 113 may be changed to a charger-discharger.

Battery 12 is provided with BMS 114. BMS 114 includes various sensors (for example, a current sensor, a voltage sensor, and a temperature sensor) for detection of a state of battery 12 and sequentially outputs a result of detection to ECU 111. ECU 111 controls charger 113 while it checks the state of battery 12 that is being charged, based on a detection signal from BMS 114. ECU 111 sequentially obtains the state (for example, the temperature, the current, and an SOC) of battery 12 based on the detection signal from BMS 114 and has the obtained battery data recorded in storage 111*b* in association with time of detection. The state of charge (SOC) represents a remaining amount of stored power and corresponds to a ratio of the current amount of stored power to an amount of stored power in a fully changed state. Such a known method as a current integration method or an open circuit voltage (OCV) estimation method can be adopted as a method of measuring the SOC.

ECU 111 has the battery data recorded during a period (including standstill and travel of vehicle 10) from start-up of a control system (including ECU 111) for vehicle 10 until shutdown thereof. The battery data recorded in storage 111b represents a history of states of battery 12.

Drive apparatus 116 includes a motor generator (MG) and a circuit (power control unit (PCU)) that drives the MG. The MG functions as a motor for travel of vehicle 10. The MG is driven by the PCU to rotate a drive wheel of vehicle 10. The MG carries out regeneration during braking (deceleration) of vehicle 10 and outputs generated electric power to battery 12. The PCU includes, for example, an inverter and a DC/DC converter. The PCU is controlled by ECU 111 to drive the MG with electric power supplied from battery 12. Vehicle 10 may include any number of motors for travel.

Communication apparatus 118 includes a communication interface (I/F) for communication with EVSE 20 (controller 21). Communication apparatus 118 further includes a communication I/F for wireless communication with a portable terminal 30. ECU 111 communicates with an external apparatus through communication apparatus 118. Vehicle 10 according to this embodiment is not a connected car, and it is configured not to wirelessly communicate with an external server (management center 500 or the like) during travel. Vehicle 10 (ECU 111) is configured to communicate with management center 500 through EVSE 20 while it is connected (in the plugged-in state) to EVSE 20 (power feed facility). ECU 111 may communicate with controller 21 of EVSE 20 through a not-shown battery ECU (a vehicle-mounted ECU that handles battery data). ECU 111 communicates with management center 500 through EVSE 20, for example, after external charging of battery 12 with the use of EVSE 20 ends and before the vehicle enters the plugged-out state, to thereby transmit the battery data (the history of the states of battery 12) recorded during travel of vehicle 10 to management center 500 (see FIG. 6 which will be described later).

Portable terminal 30 is configured as being portable by the user. Portable terminal 30 is operated while it is carried by the user (vehicle manager) of vehicle 10. In this embodiment, a smartphone equipped with a touch panel display is adopted as portable terminal 30. The smartphone contains a computer and performs a speaker function. Without being limited as such, for example, a laptop computer, a tablet terminal, a portable game console, a wearable device (a smartwatch, smartglasses, smart gloves, or the like), and an electronic key can also be adopted as portable terminal 30.

Application software (which is referred to as a "mobile app" below) for using a service provided by management center 500 is installed in portable terminal 30. With the mobile app, identification information (a terminal ID) of portable terminal 30 is registered in management center 500 in association with identification information (a vehicle ID) of corresponding vehicle 10. Portable terminal 30 can exchange information with each of management center 500, insurance server 600, server 250, and server 150 through the mobile app.

Figure 3:
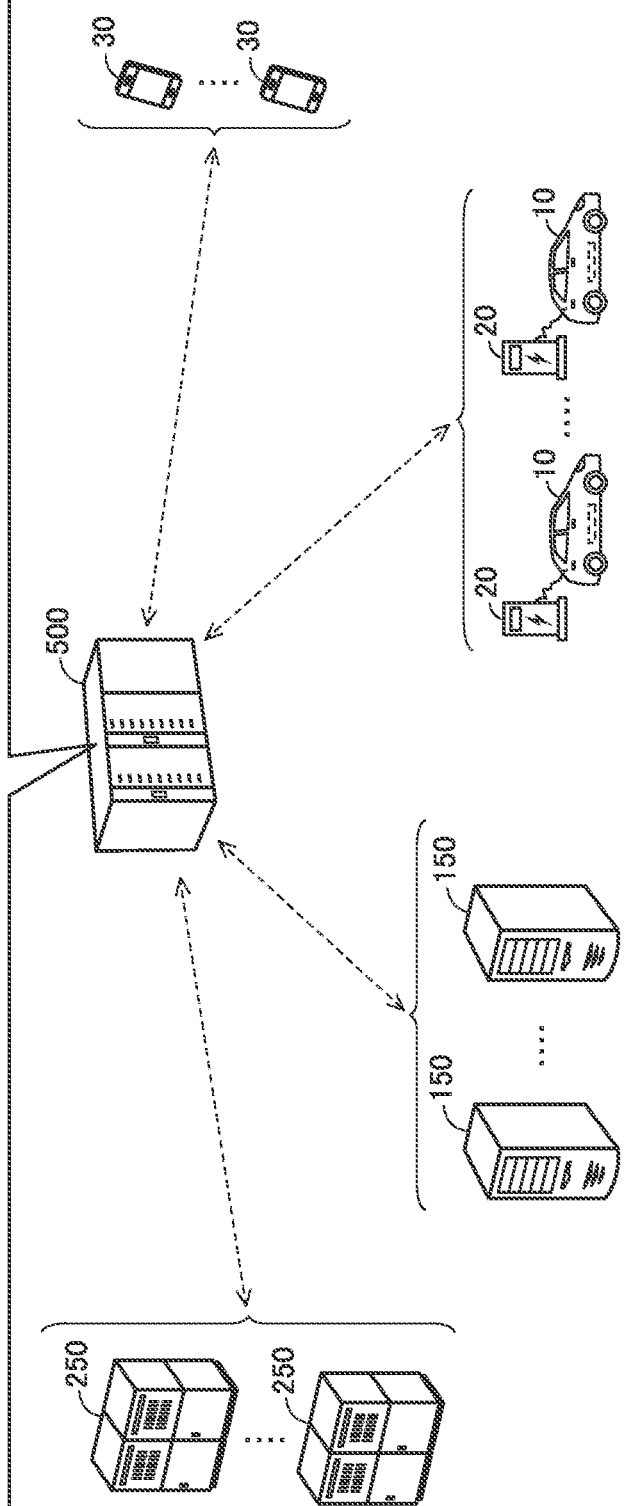
FIG. 3 is a diagram for illustrating information managed by a computer apparatus (server) according to the embodiment of the present disclosure.

FIG. 3 is a diagram for illustrating information managed by management center 500 according to this embodiment. Referring to FIG. 3, identification information (vehicle ID) of each vehicle sold or leased by dealer 100 is registered in advance in management center 500. The vehicle ID may be a vehicle Identification number (VIN). Information on each vehicle (vehicle information) is stored in storage 520 (FIG. 1) of management center 500, as being distinguished based on the vehicle ID. Management center 500 manages data included in the vehicle information as being distinguished based on an assessment period (for example, a month preceding the lease period) set for the lease period. Therefore, management center 500 can calculate the insurance fee and the lease fee for the lease period based on data during the assessment period.

The vehicle information includes use form information, user terminal information, battery information, accident risk information, deterioration risk information, and fee information.

The use form information represents a form of use of the vehicle. In this embodiment, the use form information represents the form of use of any of vehicle A (partial lease vehicle), vehicle B (full lease vehicle), and vehicle C (sold vehicle). The user terminal information represents identification information and a communication address of a user terminal (for example, portable terminal 30) for each vehicle.

The battery information corresponds to information on the battery mounted on the vehicle. The battery information includes specifications (for example, a capacity in an initial state, charging performance, and discharging performance), battery data, and a state of health (SOH).

The battery data is data representing a state of the battery detected by the sensor provided in the battery. In this embodiment, data representing a state of the battery detected by BMS 114 (FIG. 2) corresponds to the battery data. In other words, the battery data is detected in vehicle 10, transmitted from vehicle 10 through EVSE 20 to management center 500, and stored in storage 520. The battery data includes current data (for example, a "battery current-time" graph) representing transition of the current in battery 12, stored power amount data (for example, a "battery SOC-time" graph) representing transition of the SOC of battery 12, and temperature data (for example, a "battery temperature-time" graph) representing transition of the temperature of battery 12 (see FIG. 2).

Management center 500 calculates the SOH of battery 12 mounted on vehicle 10 based on the battery data obtained from vehicle 10. The SOH represents a level of health or a degree of deterioration of the battery. Examples of the SOH include a capacity retention rate and an internal resistance. As the internal resistance of the battery is higher, the degree of deterioration of the battery is higher. As the capacity retention rate of the battery is lower, the degree of deterioration of the battery is higher. In this embodiment, the capacity retention rate is adopted as the SOH.

The accident risk information corresponds to information on an accident risk of the vehicle. The accident risk information represents various accident factor parameters and accident risks in accordance with such accident factor parameters. The accident risk represents possibility that the vehicle may be involved in an accident in the future. A lower accident risk of the vehicle means lower possibility that the vehicle may be involved in an accident. Management center 500 obtains the accident factor parameters with the use of the previously-described battery data obtained from vehicle 10. A specific example of the accident factor parameter will be described later (see FIG. 4).

The deterioration risk information corresponds to information on a deterioration risk of the battery. The deterioration risk information represents various deterioration factor parameters and deterioration risks in accordance with the deterioration factor parameters. The deterioration risk represents possibility of deterioration of the power storage in the future. A lower deterioration risk of the power storage means lower possibility of deterioration of the power storage. Management center 500 obtains the deterioration factor parameters with the use of the previously-described battery data obtained from vehicle 10. A specific example of the deterioration factor parameter will be described later (see FIG. 4).

The fee information corresponds to information on a fee paid by a vehicle user to the automaker. The fee information includes an insurance fee and a lease fee. The insurance fee includes a battery insurance fee. The battery insurance fee corresponds to a fee paid for reception by the vehicle user of the insurance service relating to replacement of the battery. The lease fee includes a battery lease fee. The battery lease fee corresponds to a fee paid by the vehicle user for rental use of the battery from an owner of the battery. In this embodiment, the fee is counted as the number of points (pt). A large number of points means a high fee. The point may be handled as a virtual currency or converted to a general currency (for example, dollar, renminbi, won, or yen). The point may be converted to an item or a right (for example, a right to receive a service in conformity with the number of points).

The system that manages the electrically powered vehicle according to this embodiment includes a plurality of dealers 100 (each including server 150), a plurality of BSta's 200 (each including server 250), and a plurality of pieces of EVSE 20, and management center 500 is configured to communicate with all of them. Management center 500 is configured to communicate with vehicle 10 in the plugged-in state through EVSE 20. Management center 500 is further configured to communicate with a user terminal (portable terminal 30) for each vehicle.

Figure 4:
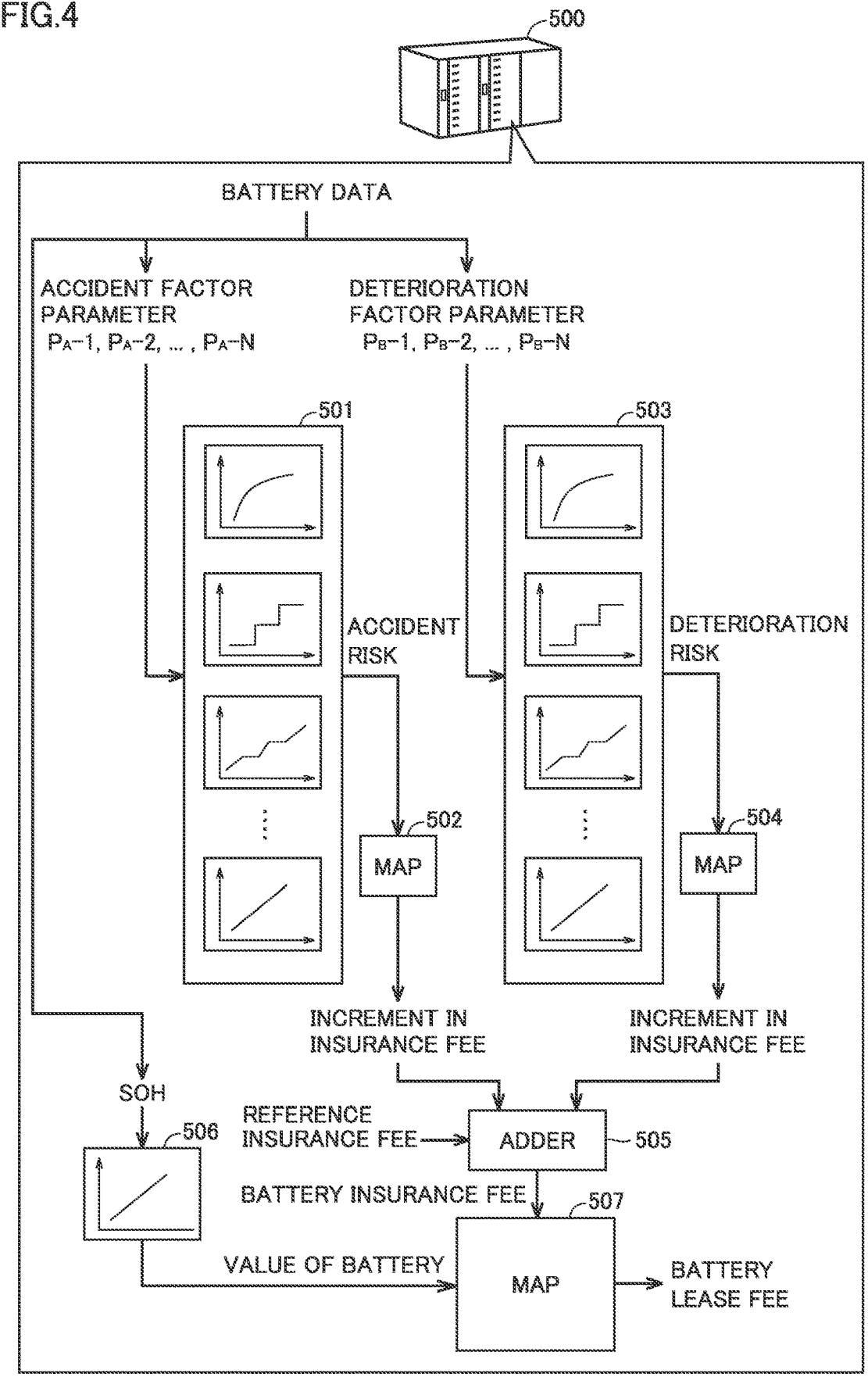
FIG. 4 is a diagram for illustrating a method of obtaining a battery lease fee in a method of managing an electrically powered vehicle according to the embodiment of the present disclosure.

FIG. 4 is a diagram for illustrating a method of obtaining a battery lease fee. Referring to FIG. 4, maps 501 to 504, 506, and 507 are stored in storage 520 (FIG. 1) of management center 500. Management center 500 includes an adder 505. Adder 505 may be implemented by a program or electronic circuitry. Management center 500 can obtain, for vehicle 10 (which is referred to a "battery leased vehicle" below) including battery 12 rented under the lease service described previously, a lease fee of battery 12 with a method which will be described below. Vehicle A or vehicle B shown in FIG. 1 falls under the battery leased vehicle. The battery leased vehicle to be subjected to processing is referred to as a "subject vehicle" below.

Management center 500 obtains an accident factor parameter ($P_A$-1, $P_A$-2, . . . , $P_A$-N) from the battery data (for example, the current data, the stored power amount data, and the temperature data shown in FIG. 2) obtained from the subject vehicle. In this embodiment, a period during which the temperature of battery 12 exceeds a prescribed reference value (which is referred to as an "acceleration and deceleration period" below) during travel of the subject vehicle, the number of times that the current in battery 12 increases toward a charging side at a rate of a charging current (charging rate) not lower than a prescribed rate from a stable state during travel of the subject vehicle (which is referred to as "the number of times of regenerative charging" below), and a cumulative amount of the current (which is referred to as an "amount of the current during travel" below) in battery 12 during travel of the subject vehicle are adopted as accident factor parameters. Though three accident factor parameters are exemplified in this embodiment, the number of accident factor parameters can be modified as appropriate.

Frequent acceleration and deceleration operations (accelerator operations or brake operations) by a driver during travel of the subject vehicle tend to increase the temperature of battery 12 of the subject vehicle. In this embodiment, the acceleration and deceleration period represents a frequency of the acceleration and deceleration operations onto the subject vehicle during travel. The prescribed reference value is set in advance in accordance with characteristics of the subject vehicle such that the frequency of the acceleration and deceleration operations onto the subject vehicle corresponds to the acceleration and deceleration period.

When hard braking is applied by the driver during travel of the subject vehicle, a resultant regenerative current tends to increase a rate of a charging current in battery 12 of the subject vehicle. In this embodiment, the number of times of regenerative charging represents the number of times of hard braking. The prescribed rate is set in advance in accordance with characteristics of the subject vehicle such that the number of times of application of hard braking in the subject vehicle corresponds to the number of times of regenerative charging. The number of times of application of hard braking per unit period corresponds to a frequency of hard braking. Management center 500 can obtain the current rate by differentiation of current data in the battery data with respect to time.

As the driver more often accelerates or decelerates the vehicle during travel of the subject vehicle, the amount of the current in battery 12 (the amount of the current that flows in the battery) of the subject vehicle tends to increase. The amount of the current during travel is a cumulative value of an amount of a discharging current (absolute value) and an amount of a charging current (absolute value) in battery 12 during travel of the subject vehicle. As the frequency of acceleration and deceleration of the subject vehicle is higher, the amount of the current during travel is larger.

Map 501 includes a plurality of maps. A map is prepared for each accident factor parameter. Each of these maps defines such relation that the accident risk is higher as the accident factor parameter is larger. In the relation defined in each map, the accident risk continuously or intermittently becomes higher with increase in accident factor parameter. When a value of the accident factor parameter is inputted to each map, the map outputs an increment in accident risk originating from the accident factor parameter. In this embodiment, map 501 outputs a lower accident risk as the inputted acceleration and deceleration period is shorter, the inputted number of times of regenerative charging is smaller, and the inputted amount of the current during travel is smaller. Map 501 obtains the increment in accident risk for each accident factor parameter, and outputs the accident risk including all increments originating from these accident factor parameters.

The accident risk outputted from map 501 may be expressed by a value calculated by addition of an increment in risk originating from the accident factor parameter to a reference value of the accident risk. The reference value of the accident risk may be a standard accident risk (for example, an average value of all users) or "0". The accident risk outputted from map 501 is inputted to map 502. Map 502 then outputs an increment in insurance fee in accordance with the inputted accident risk. Map 502 defines such relation that the insurance fee is higher as the accident risk is higher. Map 502 outputs to adder 505, the increment in insurance fee which is larger as the accident risk inputted from map 501 is higher.

Management center 500 obtains the deterioration factor parameter ($P_B$-1, $P_B$-2, . . . , $P_B$-N) from the battery data (for example, the current data, the stored power amount data, and the temperature data shown in FIG. 2) obtained from the subject vehicle. In this embodiment, a period during which the current in battery 12 exceeds a first deterioration threshold value (which is referred to as an "overcurrent period" below), a period during which the SOC of battery 12 is equal to or larger than a second deterioration threshold value (which is referred to as a "high SOC period" below), and a period during which the temperature of battery 12 exceeds a third deterioration threshold value (which is referred to as a "high temperature period" below) are adopted as deterioration factor parameters. The first deterioration threshold value corresponds to an upper limit value of a recommended current range of battery 12. When the current (a charging current or a discharging current) that flows in battery 12 exceeds the first deterioration threshold value, deterioration of battery 12 is accelerated. The second deterioration threshold value corresponds to a lower limit value of a high SOC range where deterioration of the battery is accelerated. The second deterioration threshold value may be set, for example, to approximately 80%. The third deterioration threshold value corresponds to an upper limit value of a recommended temperature range of battery 12. When the temperature of battery 12 exceeds the third deterioration threshold value, deterioration of battery 12 is accelerated. The first to third deterioration threshold values are set in advance in accordance with characteristics of battery 12. Though three deterioration factor parameters are exemplified in this embodiment, the number of deterioration factor parameters can be modified as appropriate.

Map 503 includes a plurality of maps. The map is prepared for each deterioration factor parameter. Each of these maps defines such relation that the deterioration risk is higher as the deterioration factor parameter is larger. In the relation defined in each map, the deterioration risk continuously or intermittently becomes higher with increase in deterioration factor parameter. When a value of the deterioration factor parameter is inputted to each map, the map outputs an increment in deterioration risk originating from the deterioration factor parameter. In this embodiment, map 503 outputs the lower deterioration risk as an input value (a length of a period) of the overcurrent period, the high SOC period, and the high temperature period is shorter. Map 503 obtains the increment in deterioration risk for each deterioration factor parameter, and outputs the deterioration risk including all increments originating from these deterioration factor parameters.

The deterioration risk outputted from map 503 may be expressed by a value calculated by addition of an increment in risk originating from the deterioration factor parameter to a reference value of the deterioration risk. The reference value of the deterioration risk may be a standard deterioration risk (for example, an average value of all users) or "0". The deterioration risk outputted from map 503 is inputted to map 504. Map 504 then outputs an increment in insurance fee in accordance with the inputted deterioration risk. Map 504 defines such relation that the insurance fee is higher as the deterioration risk is higher. Map 504 outputs to adder 505, the increment in insurance fee which is larger as the deterioration risk inputted from map 503 is higher.

Adder 505 outputs as the battery insurance fee, a value resulting from addition of a prescribed reference insurance fee, the increment in insurance fee inputted from map 502, and the increment in insurance fee inputted from map 504 to map 507.

Management center 500 obtains the SOH (capacity retention rate) of battery 12 based on the battery data obtained from the subject vehicle. The capacity retention rate corresponds to a ratio of a current capacity to the capacity in the initial state (a state where the battery is not deteriorated). Management center 500 can calculate the capacity retention rate based on the current capacity (the amount of stored power in the fully charged state) of battery 12 indicated in the battery data.

Management center 500 inputs the obtained value of the SOH into map 506. Map 506 outputs the value of the battery in accordance with the inputted SOH. Map 506 defines such relation that the value of the battery is lower as the SOH is lower. Map 506 outputs the value of the battery in accordance with the SOH to map 507. In this embodiment, management center 500 assesses the value of the battery based only on the SOH (capacity retention rate). Without being limited as such, management center 500 may assess the value of battery 12 mounted on the subject vehicle further based on another type of information (for example, an assessed price of the battery in markets) in addition to the SOH.

Map 507 defines relation among the value of the battery, the battery insurance fee, and the battery lease fee. Map 507 outputs the battery lease fee which is higher as the value of the battery is higher or the battery insurance fee is higher. Map 507 outputs, for example, a value calculated by addition of the value (pt/month) of the battery inputted from map 506 and the battery insurance fee (pt/month) inputted from adder 505 as the battery lease fee (pt/month). In this embodiment, map 507 functions as the adder. Without being limited as such, map 507 may calculate the battery lease fee in accordance with the value of the battery and the insurance fee, in a complicated relational expression including various coefficients.

Each map shown in FIG. 4 should only define relation between an input value and an output value, or it may be expressed in a mathematical expression. Management center 500 may be configured to update each map shown in FIG. 4. The insurance fee and the lease fee can thus readily be revised.

When dealer 100 sells or leases a vehicle, contract information (for example, the use form information and specification information) in connection with that vehicle is inputted to server 150 and transmitted from server 150 to management center 500. In this embodiment, unless a contractor (a vehicle user) shows its intention for cancellation, each time the lease period elapses, contract contents (including the lease fee) during a next lease period are determined, and the lease contract is automatically renewed. When timing to renew the lease contract comes, management center 500 determines the lease fee. Server 150 manages the lease period of each vehicle, and when the lease period of any vehicle expires, server 150 may request management center 500 to determine the lease fee for that vehicle. Management center 500 may start a series of processing shown in FIG. 5 which will be described below, in response to the request from server 150.

Figure 5:
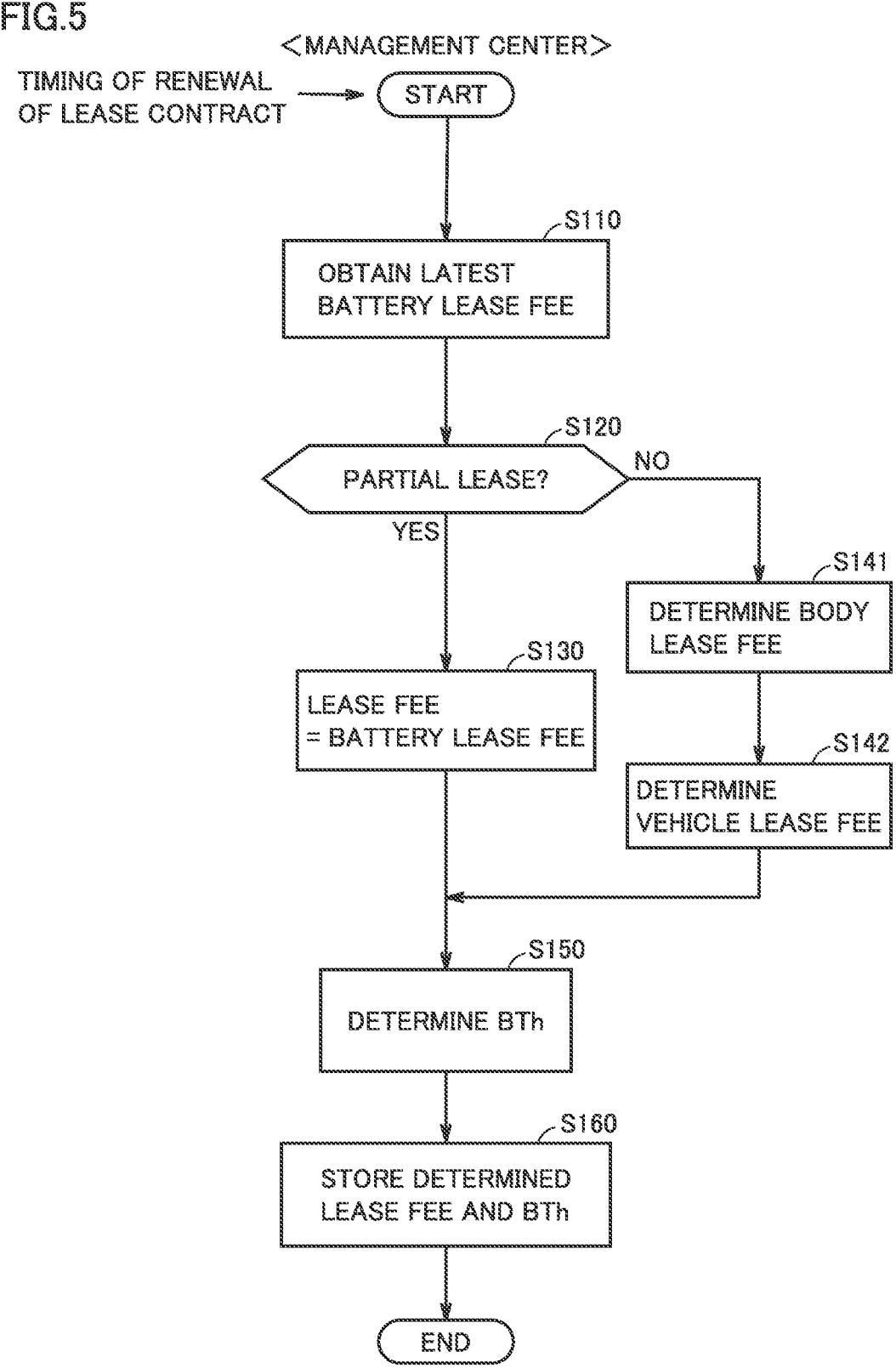
FIG. 5 is a flowchart showing processing involved with determination of a lease fee in the method of managing an electrically powered vehicle according to the embodiment of the present disclosure.

FIG. 5 is a flowchart showing processing involved with determination of a lease fee. Each step in the flowchart is simply denoted as "S" below. Management center 500 determines the lease fee (including the insurance fee) for the lease period based on data during the assessment period set before the lease period, through the series of processing shown in FIG. 5. In this embodiment, a month preceding the lease period (one month immediately before the lease period) is defined as the assessment period. Management center 500 performs the series of processing shown in FIG. 5, for example, at timing of start of a next lease period after lapse of the lease period. The lease period that has elapsed corresponds to the assessment period for the next lease period. In the series of processing shown in FIG. 5, a vehicle involved with the renewed lease contract is referred to as a "subject vehicle." The subject vehicle is any of vehicles A and B (FIG. 1).

Referring to FIG. 5, in S110, management center 500 reads the latest battery lease fee in connection with the subject vehicle from storage 520 based on the identification information (vehicle ID) of the subject vehicle. Though details will be described later, management center 500 obtains the accident risk, the deterioration risk, and the battery lease fee based on the battery data during the assessment period for the next lease period through processing in S22 in FIG. 6 which will be described later each time it receives the latest battery data from vehicle 10, and updates the battery lease fee in storage 520. In S22 in FIG. 6, according to the configuration shown in FIG. 4, the battery lease fee in accordance with the battery data during the assessment period is obtained.

In following S120, management center 500 determines whether or not the subject vehicle falls under vehicle A (partial lease vehicle) based on the use form information (FIG. 3) in storage 520. When the subject vehicle falls under vehicle A (YES in S120), in S130, management center 500 determines the battery lease fee obtained in S110 as the lease fee of the subject vehicle. Thereafter, the process proceeds to S150.

When the subject vehicle falls under vehicle B (full lease vehicle) (NO in S120), in S141, management center 500 determines a body lease fee including a body insurance fee based on the accident risk. For example, management center 500 sets a more inexpensive body lease fee as the accident risk is lower. Without being limited as such, any method of determining the body lease fee is applicable. The body lease fee may be fixed. In succession, in S142, management center 500 determines a vehicle lease fee. The vehicle lease fee is a total amount of the battery lease fee (S110) and the body lease fee (S141). Thereafter, the process proceeds to S150.

In S150, management center 500 determines a threshold value (which is denoted as "BTh" below) for battery replacement. BTh represents timing of battery replacement. BTh is set to avoid excessive deterioration of battery 12. BTh may be fixed or variable. In this embodiment, in S150, management center 500 reads the latest deterioration risk from storage 520, and sets higher BTh as the deterioration risk of battery 12 is higher. As the deterioration risk is higher, a rate of deterioration of battery 12 is higher, and as BTh is higher, the battery tends to be replaced earlier. Since BTh is higher as the deterioration risk of battery 12 is higher, excessive deterioration of battery 12 can be suppressed. Thereafter, the process proceeds to S160.

In S160, management center 500 has the lease fee and BTh determined in the above-described processing stored in storage 520 in association with the identification information (vehicle ID) of the subject vehicle and transmits them to server 150. Specifically, the lease fee (battery lease fee) and BTh of vehicle A determined in S130 and S150 are stored and transmitted. The vehicle lease fee and BTh of vehicle B determined in S142 and S150 are stored and transmitted.

Figure 6:
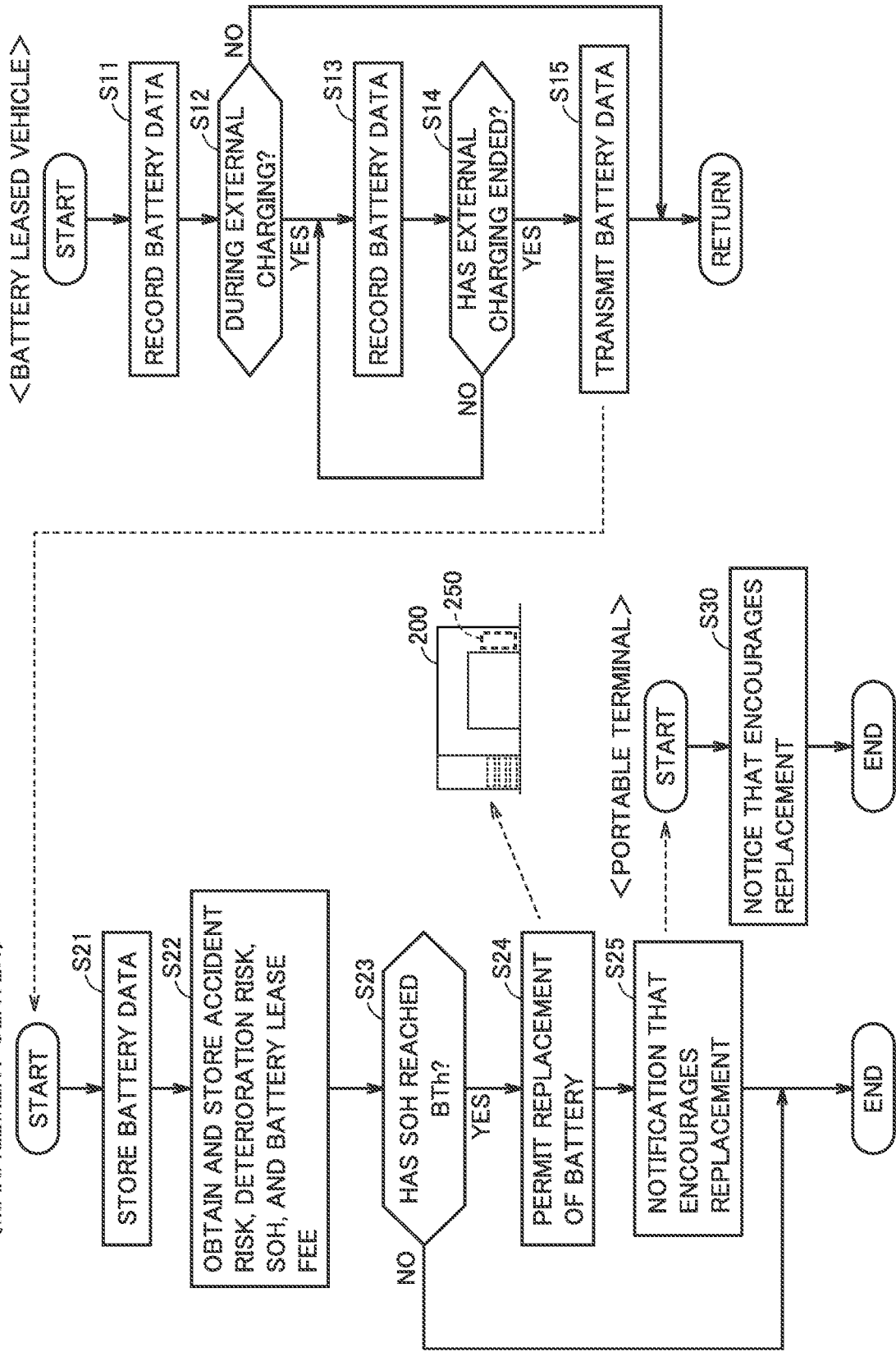
FIG. 6 is a flowchart showing processing involved with battery management in the method of managing an electrically powered vehicle according to the embodiment of the present disclosure.

FIG. 6 is a flowchart showing processing involved with vehicle management (in particular, battery management) performed by management center 500 as well as the battery leased vehicle and a user terminal thereof.

ECU 111 of the battery leased vehicle (vehicle A or B) repeatedly performs a series of processing from S11 to S15 which will be described below during a period (including standstill and travel of the vehicle) from start-up of a vehicle control system (including ECU 111) until shutdown thereof. In the series of processing shown in FIG. 6, the battery leased vehicle that performs such processing is referred to as a "subject vehicle."

In S11, ECU 111 has the battery data (for example, the data on the temperature, the current, and the SOC shown in FIG. 2) obtained by BMS 114 recorded in storage 111b in association with time of detection. In succession, in S12, ECU 111 determines whether or not the subject vehicle is carrying out external charging with the use of EVSE 20. When the subject vehicle is carrying out external charging (YES in S12), the process proceeds to S13. The subject vehicle being carrying out external charging means that the subject vehicle is in the plugged-in state.

In S13, ECU 111 has the battery data obtained by BMS 114 recorded in storage 111b in association with the time of detection, as in S11. In S13, the battery data during external charging is recorded in storage 111b. In succession, in S14, ECU 111 determines whether or not external charging has ended. During external charging, determination as NO is made in S14, and S13 and S14 are repeated. When external charging ends (YES in S14), in S15, ECU 111 communicates with management center 500 through EVSE 20 to transmit the battery data recorded in storage 111b to management center 500 together with the identification information (vehicle ID) of the subject vehicle. As a result of this processing in S15, the battery data recorded in storage 111b during the period from previous transmission (S15) until present transmission (S15) is transmitted to management center 500. The battery data transmitted in S15 includes both of the battery data recorded in S11 (for example, the battery data during standstill and travel) and the battery data during external charging recorded in S13. In S15, the identification information and position information of EVSE 20 that mediates communication are also transmitted to management center 500.

When the processing in S15 is performed, the process returns to the initial step (S11). When the subject vehicle is determined as not being carrying out external charging (NO in S12) as well, the process returns to S11. In other words, when the subject vehicle is not carrying out external charging. S11 is repeated. Thus, during any of standstill and travel of the subject vehicle, the battery data of the subject vehicle is recorded in storage 111b as a result of the processing in S11.

When management center 500 receives the battery data (S15) from the subject vehicle, it starts a series of processing from S21 to S25. In S21, management center 500 has the latest battery data received from the subject vehicle stored in storage 520 in association with the identification information (vehicle ID) of the subject vehicle. In following S22, management center 500 obtains the accident risk, the deterioration risk, the SOH, and the battery lease fee in accordance with the battery data in storage 520 with an assessment mechanism (various maps or the like) shown in FIG. 4, and has the obtained vehicle information stored in storage 520 in association with the identification information (vehicle ID) of the subject vehicle, together with current time.

In S22, management center 500 assesses the accident risk of the subject vehicle based on the battery data (in particular, the battery data during travel of the subject vehicle) during the assessment period set for the next lease period, of the battery data (including the latest battery data) stored in storage 520. Specifically, management center 500 assesses the accident risk as being lower as the acceleration and deceleration period (the period during which the temperature of battery 12 exceeds the reference value during travel of the subject vehicle) is shorter. Management center 500 obtains the number of times of regenerative charging which represents the frequency of hard braking of the subject vehicle based on the rate of the charging current in battery 12 during travel of the subject vehicle, and assesses the accident risk as being lower as the obtained frequency of hard braking (the number of times of regenerative charging) is lower. Management center 500 obtains the amount of the current during travel which represents the frequency of acceleration and deceleration of the subject vehicle during travel and assesses the accident risk as being lower as the obtained frequency of acceleration and deceleration (the amount of the current during travel) is lower. The method of assessing the accident risk is not limited to the above. The parameter relating to safe drive included in the battery data during travel is not limited to the acceleration and deceleration period, the number of times of regenerative charging, and the amount of the current during travel, and can be modified or added as appropriate.

In S22, management center 500 assesses the deterioration risk of battery 12 of the subject vehicle based on the battery data during the assessment period (including the battery data during standstill, travel, and external charging) set for the next lease period, of the battery data (including the latest battery data) stored in storage 520. Specifically, management center 500 assesses the deterioration risk as being lower as the overcurrent period is shorter. Management center 500 assesses the deterioration risk as being lower as the high SOC period is shorter. Management center 500 assesses the deterioration risk as being lower as the high temperature period is shorter. The method of assessing the deterioration risk is not limited to the above. The deterioration risk may be assessed as being lower, for example, as the time period during which the temperature of the battery is out of a prescribed temperature range (for example, a normal range) is shorter during the assessment period. Alternatively, the deterioration risk may be assessed as being lower as the time period during which the rate of the current in the battery is equal to or higher than a prescribed value is shorter during the assessment period. Alternatively, the deterioration risk may be assessed only based on the battery data during travel.

In S22, management center 500 obtains the current capacity of battery 12 of the subject vehicle based on whole battery data (data from start of use of battery 12 in the subject vehicle until the current time point) stored in storage 520 and calculates the SOH (capacity retention rate) based on the obtained current capacity.

Furthermore, management center 500 obtains the battery insurance fee in accordance with the accident risk and the deterioration risk assessed as above, with maps 502 and 504 and adder 505 shown in FIG. 4. Management center 500 obtains the value (current value) of battery 12 in accordance with the SOH calculated as above with map 506 shown in FIG. 4. Management center 500 then obtains the battery lease fee in accordance with the value of the battery and the battery insurance fee with map 507 shown in FIG. 4.

As the latest accident risk, deterioration risk, SOH, and battery lease fee are stored in storage 520 as a result of the processing in S22, in following S23, management center 500 determines whether or not the SOH (capacity retention rate) of battery 12 mounted on the subject vehicle has reached BTh (S150 in FIG. 5). When the capacity retention rate of battery 12 obtained in S22 is equal to or lower than BTh, determination as YES is made in S23 and processing in S24 and S25 which will be described below is performed. When the capacity retention rate is higher than BTh (NO in S23), on the other hand, the series of processing from S21 to S25 ends without the processing in S24 and S25 being performed. When battery 12 is determined as having failed based on the latest battery data, management center 500 may also make determination as YES in S23.

In S24, management center 500 indicates to server 250 of at least one BSta 200 present around the subject vehicle, permission to replace battery 12 mounted on the subject vehicle. Specifically, management center 500 identifies a position of the subject vehicle based on the position information of EVSE 20. At least one BSta 200 present around the subject vehicle may be single BSta 200 closest to a position of the subject vehicle (a position of EVSE 20) or at least one BSta 200 present within a prescribed distance from the position of the subject vehicle. Management center 500 transmits a replacement permission signal including the identification information (vehicle ID) of the subject vehicle to server 250 of at least one BSta 200 present around the subject vehicle. This replacement permission signal indicates permission of replacement of the battery in the subject vehicle at BSta 200. Server 250 identifies the vehicle, the battery of which is to be replaced, based on the vehicle ID included in the replacement permission signal. The vehicle ID included in the replacement permission signal is registered in server 250, and replacement of the battery in the subject vehicle indicated by the vehicle ID is programmed in server 250. Server 250 can have programmed battery replacement carried out in processing shown in FIG. 7 which will be described later. When the battery is not replaced even after lapse of a prescribed period since programming of battery replacement, the programming may be canceled.

In following S25, management center 500 gives a notification (which is referred to as a "replacement notification" below) that encourages replacement of the battery under the insurance service to the user terminal (portable terminal 30) of the subject vehicle. When the processing in S25 is performed, the series of processing from S21 to S25 ends.

When portable terminal 30 corresponding to the user terminal of the subject vehicle receives the replacement notification, it performs processing in S30. In S30, portable terminal 30 performs notice processing to encourage the user of the subject vehicle to replace the battery. For example, portable terminal 30 may turn on a sound notifying the user of reception of the replacement notification and show a message that encourages the user to replace the battery.

Figure 7:
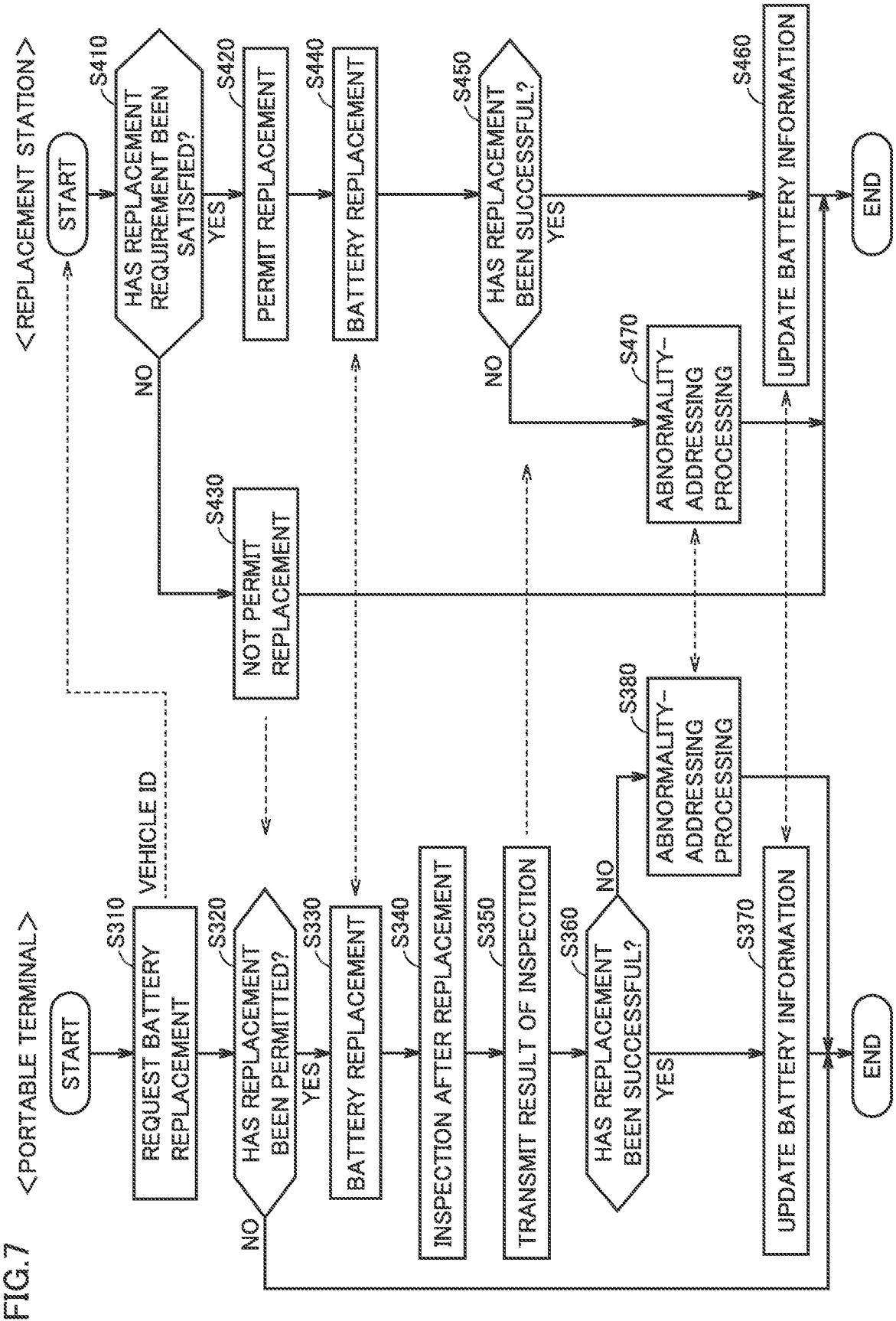
FIG. 7 is a flowchart showing processing involved with battery replacement performed by a user terminal of a battery leased vehicle and a terminal at a replacement station in the method of managing an electrically powered vehicle according to the embodiment of the present disclosure.

The vehicle user encouraged to replace the battery may drive the battery leased vehicle toward BSta 200. When the battery leased vehicle (vehicle A or B) satisfies a prescribed replacement requirement, it can have the battery replaced at BSta 200. FIG. 7 is a flowchart showing processing involved with battery replacement performed by the user terminal (portable terminal 30) of the battery leased vehicle and a battery replacement station terminal (server 250).

Referring to FIG. 7 together with FIGS. 1 to 3, a series of processing from S310 to S380 is performed by portable terminal 30. A series of processing from S410 to S470 is performed by server 250. Server 250 is configured to wirelessly communicate with portable terminal 30. Server 250 and portable terminal 30 may establish short-range communication, for example, through a wireless local area network (LAN) or communicate over communication network NW.

The battery leased vehicle arrives at BSta 200, and thereafter the user of the battery leased vehicle operates portable terminal 30 to ask BSta 200 to replace the battery. The series of processing from S310 to S380 is thus started. In S310, portable terminal 30 transmits a signal requesting battery replacement (which is also referred to as a "request signal" below) to server 250. In the series of processing shown in FIG. 7, the battery leased vehicle is referred to as a "subject vehicle." Battery 12 yet to be replaced that is included in the subject vehicle is denoted as a "battery B1." The request signal includes identification information (a vehicle ID) of the subject vehicle.

In S410, server 250 that has received the request signal determines whether or not a prescribed replacement requirement is satisfied. Specifically, server 250 determines whether or not the replacement requirement is satisfied based on whether or not the vehicle ID included in the request signal matches with the vehicle ID included in the replacement permission signal (S24 in FIG. 6). In other words, when the vehicle ID of the subject vehicle has been registered (programmed), the replacement requirement is satisfied, and when the vehicle ID of the subject vehicle has not been registered (programmed), the replacement requirement is not satisfied.

When the replacement requirement is satisfied (YES in S410), in S420, server 250 sends a notification indicating permission to portable terminal 30, and thereafter the process proceeds to S440. When the replacement requirement is not satisfied (NO in S410), on the other hand, in S430, server 250 sends a notification indicating non-permission to portable terminal 30, and thereafter the series of processing from S410 to S470 ends. In this case, the battery is not replaced.

Portable terminal 30 transmits the request signal (S310), and thereafter it waits for reply from server 250. When portable terminal 30 receives the reply from server 250, in S320, it determines whether or not replacement of the battery has been permitted. When portable terminal 30 receives the notification indicating permission (YES in S320), the process proceeds to S330. When portable terminal 30 receives the notification indicating non-permission (NO in S320), on the other hand, the series of processing from S310 to S380 ends. In this case, the battery is not replaced.

In S330 and S440, the battery is replaced in a procedure which will be described later (see FIG. 8). In S330, portable terminal 30 may give a notice to the user of the subject vehicle that the battery is being replaced. Battery 12 attached to the subject vehicle as a result of battery replacement is denoted as a "battery B2" below. When replacement of the battery is completed, in S340, portable terminal 30 requests the subject vehicle to inspect battery B2. The subject vehicle determines that the battery has successfully been replaced unless abnormality (for example, defective connection or abnormal electrical performance) is found in the inspection, and determines that replacement of the battery has failed when abnormality is found in the inspection. In succession, in S350, portable terminal 30 transmits a result of inspection obtained from the subject vehicle to server 250. In succession, in S360, portable terminal 30 determines whether or not the battery has successfully been replaced in accordance with the result of inspection (normal/abnormal). Similarly, in S450, server 250 that has received the result of inspection also determines whether or not the battery has successfully been replaced in accordance with the result of inspection.

When the battery has successfully been replaced (YES in S360 and YES in S450), the battery information held in the subject vehicle and server 250 is updated in S370 and S460, respectively. In S370, portable terminal 30 obtains specification information of battery B2 from server 250 and requests the subject vehicle to update the battery information. Thereafter, the series of processing shown in FIG. 7 ends.

When replacement of the battery has failed (NO in S360 and NO in S450), on the other hand, portable terminal 30 and server 250 perform prescribed abnormality-addressing processing in S380 and S470, respectively. The abnormality-addressing processing may include processing for notifying the user of the subject vehicle of failure in replacement of the battery. The abnormality-addressing processing may include processing for notifying management center 500 of failure in replacement of the battery. The abnormality-addressing processing may include processing for once detaching battery B2 attached to the subject vehicle from the subject vehicle and redoing replacement of the battery. After the abnormality-addressing processing is performed, the series of processing shown in FIG. 7 ends. The abnormality-addressing processing can freely be set.

Figure 8:
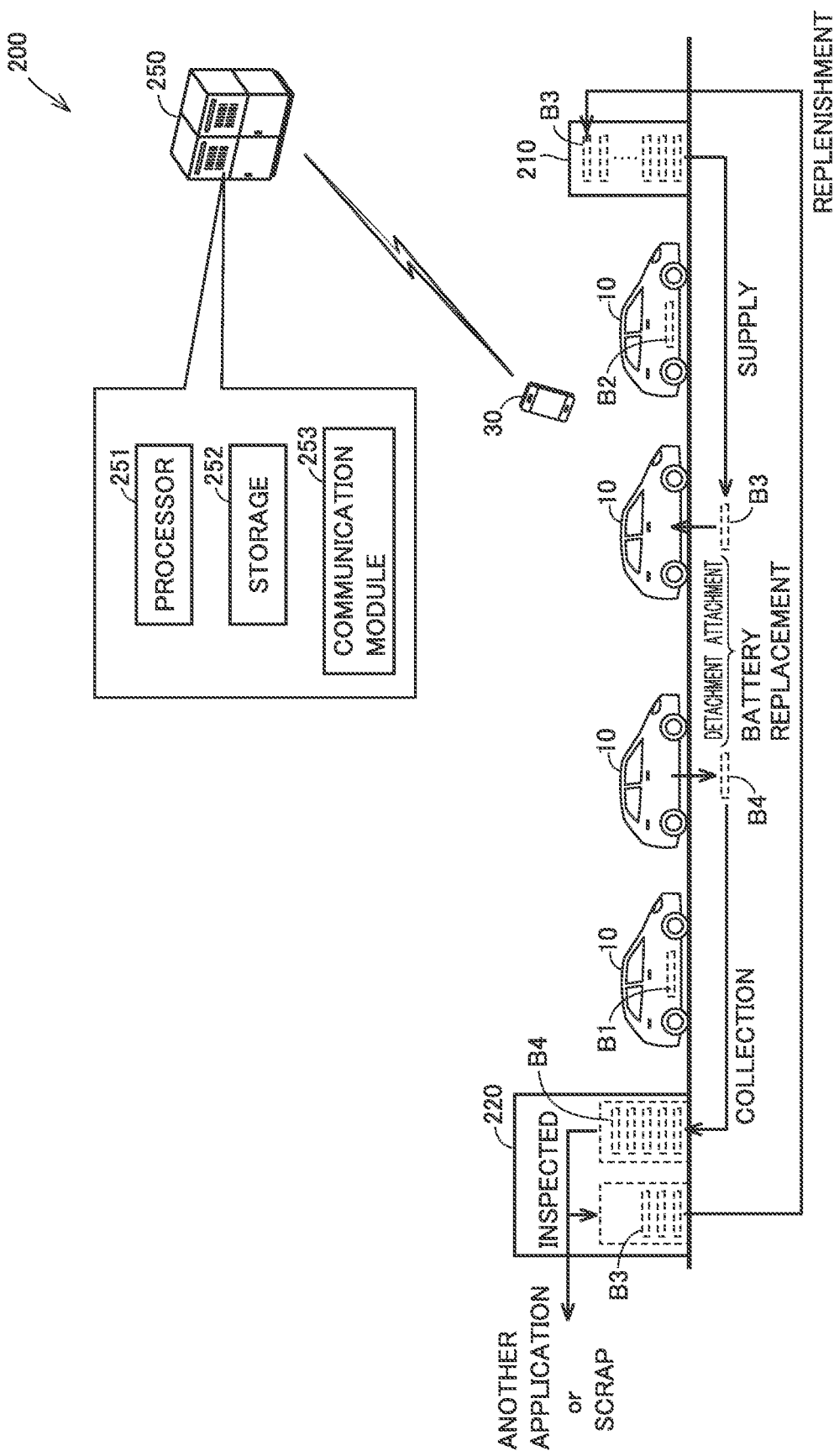
FIG. 8 is a diagram for illustrating a configuration and an operation of the replacement station included in the management system according to the embodiment of the present disclosure.

FIG. 8 is a diagram for illustrating a configuration and an operation of a battery replacement station (BSta 200) according to this embodiment.

Referring to FIG. 8 together with FIGS. 1 and 2, BSta 200 includes a storage apparatus 210, an inspection portion 220, and server 250. Storage apparatus 210 includes an accommodation portion (for example, a storage). Inspection portion 220 includes, for example, a charger-discharger, a measurement apparatus, and a categorization apparatus. BSta 200 further includes a transport apparatus that transports the power storage and a replacement apparatus that replaces the power storage. A type of transport may be a conveyor type or a type with the use of a delivery robot. Server 250 controls each of the transport apparatus and the replacement apparatus.

Server 250 includes a processor 251, a storage 252, and a communication module 253. Information on each battery present in BSta 200 is stored in storage 252, as being distinguished based on identification information (a battery ID) of the battery. The battery information held by server 250 includes, for example, specifications (for example, the capacity in the initial state, charging performance, and discharging performance), a status (for example, any one of yet-to-be-inspected/inspected (reuse/another application/scrap)/suppliable), the SOH, and the SOC. Server 250 sequentially transmits the information it holds to management center 500. Management center 500 may manage inventory of batteries at each BSta 200 based on the battery information from server 250. The battery present in BSta 200 is a property of the automaker. A new battery may be supplied from a warehouse of the automaker to BSta 200 or a secondhand battery collected from vehicle 10 may be stored in BSta 200. Batteries may be transported among a plurality of BSta's 200.

In response to a request for battery replacement (S310 in FIG. 7), server 250 starts control for battery replacement (S440 in FIG. 7). Server 250 has the battery of the subject vehicle replaced, for example, in a procedure as below.

Server 250 selects a battery (replacement battery) corresponding to battery B1 from among a plurality of batteries B3 accommodated in the accommodation portion of storage apparatus 210. Selected battery B3 is the same in specifications (for example, the capacity in the initial state, charging performance, and discharging performance) as battery B1. Battery B3, however, is lower in degree of deterioration than battery B1. The SOC of battery B3 is equal to or higher than a prescribed SOC value (for example, 50%).

In succession, the replacement apparatus detaches battery B1 from the subject vehicle. The battery detached from the subject vehicle is denoted as a "battery B4" below. In succession, the transport apparatus transports (supplies) battery B3 from storage apparatus 210 to the replacement apparatus. In succession, the replacement apparatus attaches supplied battery B3 to the subject vehicle. Replacement of the battery of the subject vehicle is thus completed.

BSta 200 performs a process for reuse of battery B4 detached from the subject vehicle, in parallel to the battery replacement process above. When battery B4 is detached from the subject vehicle, server 250 starts control for battery reuse. The reuse process is performed, for example, in a procedure as below.

The transport apparatus transports (collects) battery B4 to inspection portion 220. In succession, inspection portion 220 inspects collected battery B4. The charger-discharger and the measurement apparatus in inspection portion 220 perform inspection. Battery B4 may be subjected to SOH recovery processing before inspection.

In the inspection, the charger-discharger has battery B4 discharged until the SOC attains, for example, to a prescribed first SOC value (for example, the SOC value indicating an empty state) or lower, and thereafter it has battery B4 charged until the SOC attains to a prescribed second SOC value (for example, the SOC value indicating the fully charged state) or higher. The measurement apparatus includes various sensors, and measures a state (for example, a temperature, a current, and a voltage) of battery B4 during charging and/or discharging. The measurement apparatus then detects the SOH of battery B4 from measured data. The measurement apparatus may further include a camera for inspection of an appearance. The charger-discharger may repeat charging and discharging of battery B4 until the measurement apparatus obtains necessary inspection data.

When the inspection is completed, the categorization apparatus in inspection portion 220 categorizes battery B4 into a battery for reuse as a vehicle battery, a battery for use in another application (an application other than the application for the vehicle), and scrap, in accordance with a result of the inspection. Examples of another application include stationary use. The battery may be scrapped in any manner. In a scrap process, the battery may be disassembled to a material level to collect a recyclable material (resource) for reuse of the material (resource recycle). The categorization apparatus may categorize battery B4 having a significantly damaged appearance into a non-reusable battery (another application or scrap).

Battery B4 reusable as the vehicle battery is handled as battery B3 described previously. After the inspection, the transport apparatus transports battery B3 to storage apparatus 210. Storage apparatus 210 is replenished with transported battery B3. Inspected and charged battery B3 is thus set in storage apparatus 210 and becomes suppliable. Without being limited as such, storage apparatus 210 may be configured to charge inspected battery B3.

FIG. 8 shows an example where detachment of the battery and attachment of the battery are performed at different locations. The subject vehicle may be transported from a detachment position to an attachment position by a not-shown transport apparatus (for example, a transport apparatus of a conveyor type). Without being limited as such, detachment of the battery and attachment of the battery may be performed at the same location. The battery may be replaced (detached and attached) while the subject vehicle is at a standstill (for example, a parked state). It is not essential that the battery yet to be replaced and the replaced battery are the same in specifications. A vehicle-mounted battery may be replaced with a battery different in specifications. For example, the capacity of the vehicle-mounted battery may be increased by battery replacement.

As described above, the method of managing the electrically powered vehicle according to this embodiment includes processing shown in FIGS. 2 and 4 to 8. In this embodiment, management center 500 corresponds to an exemplary "computer apparatus" according to the present disclosure. The processing is performed by execution by at least one processor, of a program stored in at least one memory. The processing, however, may be performed by dedicated hardware (electronic circuitry) rather than software.

The method of managing an electrically powered vehicle according to this embodiment includes obtaining, for an electrically powered vehicle configured to travel with electric power from a battery, battery data representing a state of the battery detected by a sensor provided in the battery, assessing an accident risk of the electrically powered vehicle based on the battery data during travel of the electrically powered vehicle, and providing a prescribed service based on a result of assessment of the accident risk.

Specifically, in the processing shown in FIG. 6, EVSE 20 draws up the battery data accumulated in the electrically powered vehicle and management center 500 obtains the battery data from EVSE 20 (see FIGS. 2 and 3). Therefore, the electrically powered vehicle can send the battery data to management center 500 without establishing wireless communication. Though EVSE 20 is unable to draw up vehicle behavior data (a position, a steering angle, a vehicle speed, or the like) that directly represents the behavior of the vehicle from the electrically powered vehicle, it can draw up the battery data from the electrically powered vehicle. Management center 500 then has the obtained battery data stored (S21), and in S22, it assesses the accident risk of the electrically powered vehicle based on the battery data during travel of the electrically powered vehicle (see FIG. 4). In the electrically powered vehicle, the behavior of the vehicle during travel is reflected on the battery data during travel (that is, the state of the battery during travel detected by the sensor provided in the battery). In particular in the BEV, the battery data during travel tends to well represent the behavior of the vehicle during travel. Management center 500 then provides the insurance service and the lease service based on the result of assessment of the accident risk (see FIGS. 1 and 5 to 8). Under such an insurance service, replacement of the battery mounted on the electrically powered vehicle is facilitated when replacement of the battery is necessary. Without being limited as such, the prescribed service may include a service to give advice about safe drive to the vehicle user instead of or in addition to at least one of the insurance service and the lease service. The prescribed service may be the insurance service for all of vehicles A to C.

The method of managing the electrically powered vehicle according to this embodiment further includes assessing a deterioration risk of the battery based on the battery data (S22 in FIG. 6) and determining an insurance fee (a fee for a user of the electrically powered vehicle to receive the insurance service) for a lease period based on the accident risk and the deterioration risk assessed based on the battery data during an assessment period set before the lease period (a period of coverage by the insurance service) (see FIG. 5). According to such a method, the accident risk of the electrically powered vehicle and the deterioration risk of the battery can appropriately be assessed based on the battery data (that is, the state of the battery detected by the sensor provided in the battery). The method does not require the vehicle behavior data, and hence the insurance service in accordance with the accident risk of the electrically powered vehicle and the deterioration risk of the battery can be provided with a small amount of data. Setting of the appropriate insurance fee is facilitated by varying the insurance fee in accordance with the accident risk and the deterioration risk.

In the embodiment, a length (unit period) of the lease period is set to one month. Without being limited as such, the unit period can freely be set, and a period longer than one month (for example, three months, six months, or one year) may be set. The assessment period can also be changed as appropriate. The assessment period should only be a period preceding the lease period and any period can be set. For example, the entire period of use of the battery (a period from start of use of the battery until renewal of the lease contract) in the past may be defined as the assessment period and the lease fee (including the insurance fee) for the next lease period may be determined.

The method of managing the electrically powered vehicle according to this embodiment further includes obtaining a capacity retention rate of the battery based on the battery data (S22 in FIG. 6) and determining a lease fee of the battery for a lease period based on the capacity retention rate of the battery and the insurance fee for the lease period (see FIGS. 4 and 5). Such a method does not require the vehicle behavior data, and hence the lease service in accordance with the accident risk of the electrically powered vehicle and the deterioration risk of the battery can be provided with a small amount of data. Setting of the appropriate lease fee is facilitated by varying the lease fee in accordance with the insurance fee and the capacity retention rate described previously.

The method of managing the electrically powered vehicle according to this embodiment further includes encouraging a user of the electrically powered vehicle to replace the battery under the insurance service (S25 in FIG. 6) when the capacity retention rate of the battery is equal to or lower than the prescribed threshold value (BTh). According to such a method, when the capacity retention rate of the battery mounted on the electrically powered vehicle lowers, the user of the electrically powered vehicle is encouraged to replace the battery. Therefore, the user can replace the battery each time the capacity retention rate of the battery lowers, and use of the electrically powered vehicle over a long period is facilitated. Furthermore, since excessive deterioration of the battery is suppressed, reuse of the battery detached from the electrically powered vehicle is facilitated.

The accident risk of the electrically powered vehicle and the deterioration risk of the battery may be assessed separately by different servers. Processing flows shown in FIGS. 5 to 7 can be modified as appropriate. For example, depending on an object, the order of processing may be changed or an unnecessary step may be omitted. Contents in any processing may be modified. For example, such modification may be made that the processing in S22 in FIG. 6 is performed in S110 in FIG. 5. It is not essential that the battery data is transmitted to the computer apparatus (for example, management center 500) each time the vehicle carries out external charging, and the vehicle may transmit the battery data to the computer apparatus at the time of external charging after lapse of a prescribed period (for example, several days or one month) since previous transmission.

Figure 9:
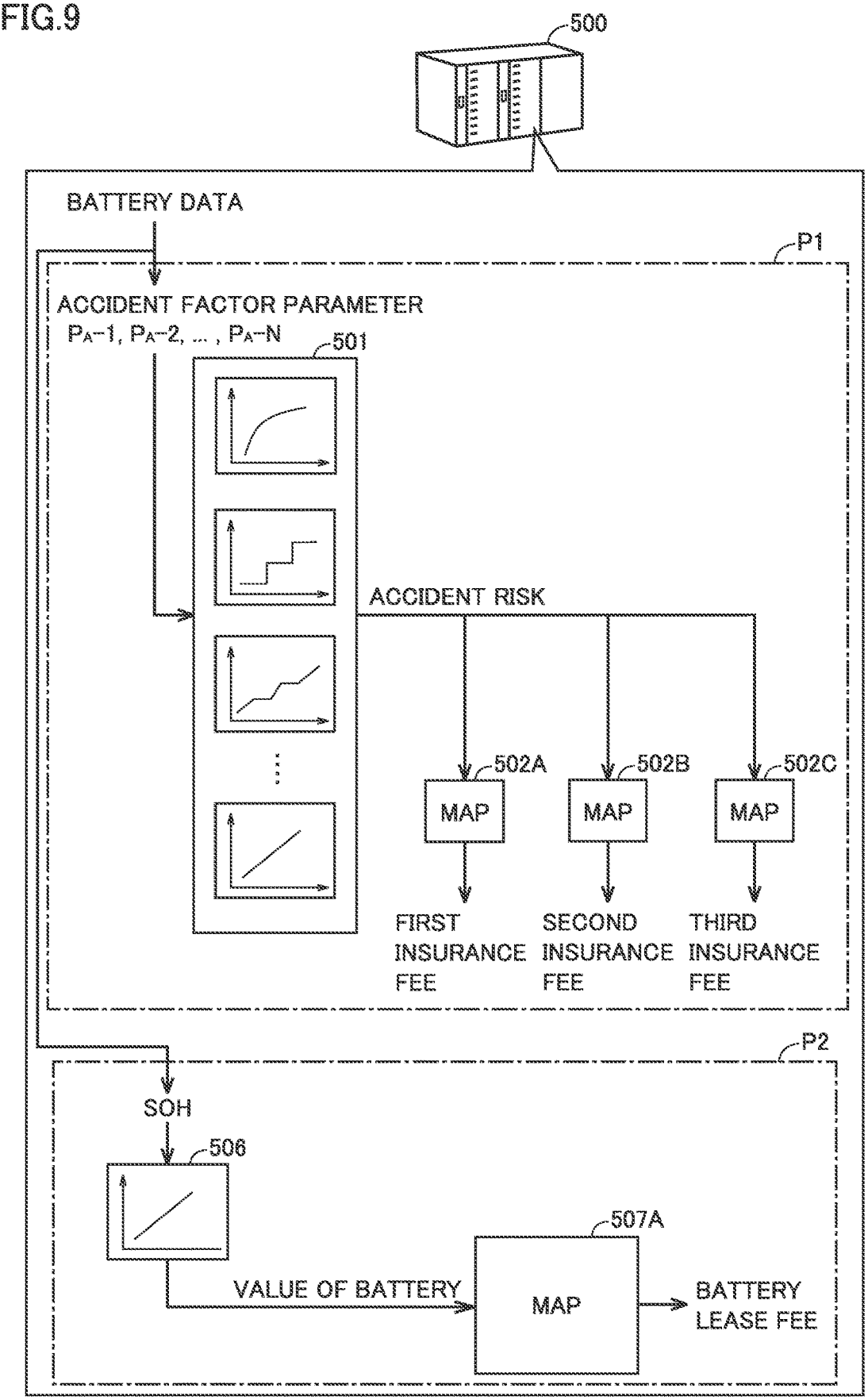
FIG. 9 is a diagram showing a modification of the configuration shown in FIG. 4.

Management center 500 may include an assessment mechanism shown in FIG. 9, instead of the assessment mechanism shown in FIG. 4. FIG. 9 is a diagram showing a modification of the configuration shown in FIG. 4. Referring to FIG. 9, the assessment mechanism according to this modification includes a first fee output unit P1 that outputs an insurance fee associated with the subject vehicle based on the battery data of the subject vehicle and a second fee output unit P2 that outputs a lease fee associated with the subject vehicle based on the battery data of the subject vehicle. Each of first fee output unit P1 and second fee output unit P2 is implemented, for example, by processor 510 and a program in storage 520 executed by processor 510 (see FIG. 1).

First fee output unit P1 includes maps 501, 502A, 502B, and 502C. First fee output unit P1 obtains the accident factor parameter ($P_A$-1, $P_A$-2, . . . , $P_A$-N) based on the battery data (for example, the current data, the stored power amount data, and the temperature data shown in FIG. 2) similarly to the assessment mechanism shown in FIG. 4, and provides the obtained accident factor parameter to map 501. Map 501 in FIG. 9 is the same as map 501 shown in FIG. 4. The accident risk outputted from map 501, however, is inputted to each of maps 502A, 502B, and 502C.

The subject vehicle is covered, for example, by a vehicle insurance and a damage insurance (except for the vehicle insurance). The vehicle insurance is an insurance for compensation for damages to a vehicle (subject vehicle), of damages associated with a car accident. The damage insurance (except for the vehicle insurance) is a car insurance except for the vehicle insurance, and specifically an insurance for compensation for damages to anything other than the vehicle (subject vehicle), of damages associated with a car accident.

Map 502A outputs a first insurance fee in accordance with the inputted accident risk. The first insurance fee is an insurance fee associated with vehicle C (sold vehicle). Map 502B outputs a second insurance fee in accordance with the inputted accident risk. The second insurance fee is an insurance fee associated with vehicle A (partial lease vehicle). Map 502C outputs a third insurance fee in accordance with the inputted accident risk. The third insurance fee is an insurance fee associated with vehicle B (full lease vehicle). Each of the first to third insurance fees is an insurance fee paid by the user of the subject vehicle for reception of the insurance service. Each of maps 502A to 502C outputs the insurance fee that is more inexpensive as the inputted accident risk is lower. Maps 502A to 502C output insurance fees different from one another. The first to third insurance fees may be ordered in the descending order of magnitude of the fees. For example, for vehicle A, at least a part of the insurance fee relating to damages to battery 12A, of the insurance fee for the vehicle insurance may be born by the leasing company (the owner of battery 12A). For vehicle B, at least a part of the insurance fee for the vehicle insurance may be born by the leasing company (the owner of body 11B and battery 12B).

Second fee output unit P2 includes maps 506 and 507A. Second fee output unit P2 obtains the SOH (for example, the capacity retention rate) based on the battery data (for example, the current data, the stored power amount data, and the temperature data shown in FIG. 2) similarly to the assessment mechanism shown in FIG. 4, and provides the obtained SOH to map 506. Map 506 outputs the value of the battery in accordance with the inputted SOH. The value of the battery outputted from map 506 is provided to map 507A. Map 507A outputs the battery lease fee in accordance with the value of the battery. The battery lease fee is a fee to be paid by the user of the subject vehicle for being provided with battery 12 under the lease service. Map 507A outputs the battery lease fee which is higher as the value of battery 12 is higher.

Management center 500 including the assessment mechanism shown in FIG. 9 may perform processing shown in FIG. 10 instead of the processing shown in FIG. 5. FIG. 10 is a flowchart showing a modification of the processing shown in FIG. 5. The processing shown in this flowchart is performed for each of a plurality of vehicles 10 managed by management center 500. Management center 500 repeatedly performs a series of processing shown in FIG. 10 for each vehicle. In the description of this processing, a vehicle to be subjected to processing is referred to as a "subject vehicle" below.

Referring to FIG. 10 together with FIG. 9, in S510, management center 500 determines whether or not timing of renewal of the lease contract in connection with the subject vehicle has come. When the subject vehicle falls under vehicle C, determination as NO is made in S510 and the process proceeds to S540. When the subject vehicle falls under vehicle A or B as well, before timing of renewal of the lease contract, the process similarly proceeds to S540. When timing of renewal of the lease contract in connection with vehicle A or B comes, determination as YES is made in S510 and the process proceeds to S520.

In S520, as in S120 in FIG. 5, management center 500 determines whether or not the subject vehicle falls under vehicle A. When the subject vehicle falls under vehicle A (YES in S520), in S531, management center 500 determines the lease fee (a first lease fee) for vehicle A and has the lease fee stored in storage 520. Specifically, management center 500, for example, inputs the battery data during the assessment period for the next lease period to second fee output unit P2 and determines the battery lease fee outputted from second fee output unit P2 as the first lease fee for the next lease period. When the subject vehicle falls under vehicle B (NO in S520), in S532, management center 500 determines the lease fee (a second lease fee) for vehicle B and has the lease fee stored in storage 520. Specifically, management center 500, for example, inputs the battery data during the assessment period for the next lease period to second fee output unit P2 and determines an amount calculated by adding the body lease fee to the battery lease fee outputted from second fee output unit P2 as the second lease fee for the next lease period. Any method of determining the body lease fee is applicable. Management center 500 may set the body lease fee to be more inexpensive as the accident risk is lower. Alternatively, the body lease fee may be fixed. When the first or second lease fee is stored in S531 or S532, the process proceeds to S540.

In S540, management center 500 determines whether or not timing of renewal of an insurance contract of the subject vehicle has come. Before timing of renewal of the insurance contract, determination as NO is made in S540. The series of processing shown in FIG. 10 ends and the process returns to the initial step (S510). When timing of renewal of the insurance contract comes, on the other hand, determination as YES is made in S540 and the process proceeds to S550. In S550, management center 500 determines whether the subject vehicle falls under vehicle A or B. When the subject vehicle falls under vehicle A or B (YES in S550), in S560, management center 500 determines whether or not the subject vehicle falls under vehicle A.

When the subject vehicle falls under vehicle C (NO in S550), in S571, management center 500 determines the first insurance fee and has the first insurance fee stored in storage 520. Specifically, management center 500, for example, inputs the battery data during the assessment period for a next period of coverage by the insurance to first fee output unit P1, and determines the first insurance fee outputted from first fee output unit P1 as the insurance fee for the next period of coverage by the insurance. Alternatively, when the subject vehicle falls under vehicle A (YES in S560), in S572, management center 500 determines the second insurance fee and has the second insurance fee stored in storage 520. Specifically, management center 500, for example, inputs the battery data during the assessment period for the next period of coverage by the insurance to first fee output unit P1, and determines the second insurance fee outputted from first fee output unit P1 as the insurance fee for the next period of coverage by the insurance. Alternatively, when the subject vehicle falls under vehicle B (NO in S560), in S573, management center 500 determines a third insurance fee and has the third insurance fee stored in storage 520. Specifically, management center 500, for example, inputs the battery data during the assessment period for the next period of coverage by the insurance to first fee output unit P1, and determines the third insurance fee outputted from first fee output unit P1 as the insurance fee for the next period of coverage by the insurance. When the insurance fee is stored in any of S571, S572, and S573, the series of processing shown in FIG. 10 ends and the process returns to S510. Management center 500 charges the user of the subject vehicle, the lease fee and the insurance fee determined as above.

The method of managing the electrically powered vehicle according to the modification includes assessing the value of the battery based on the battery data (see S531 and S532 in FIGS. 9 and 10), determining the lease fee for the user of the electrically powered vehicle to receive the lease service for rental of the battery based on the value of the battery (see S531 and S532 in FIGS. 9 and 10), and determining the insurance fee for the user of the electrically powered vehicle to receive the insurance service for compensation for damages associated with an accident of the electrically powered vehicle based on the accident risk of the electrically powered vehicle (see S571 to S573 in FIGS. 9 and 10). According to the method, the insurance fee on which the accident risk of the electrically powered vehicle is reflected and the lease fee on which the depreciation of the battery is reflected can be determined.

In the modification, the lease period and the period of coverage by the insurance may be the same or different. The assessment period is set to precede the lease period and the period of coverage. Second fee output unit P2 shown in FIG. 9 is not an essential feature. For example, the battery lease fee may be fixed, without providing second fee output unit P2. The assessment mechanism may be implemented only by first fee output unit P1. S510, S520, S531, and S532 in FIG. 10 do not have to be performed.

Functions performed by management center 500 in the embodiment may be performed by server 150 (dealer terminal). Server 150 instead of management center 500 may function as the "computer apparatus" according to the present disclosure. In this embodiment, management center 500, insurance server 600, server 150, and server 250 are each an on-premise server. Without being limited as such, the function of each server may be implemented on the cloud by cloud computing. In other words, these servers may be cloud servers. A location where the lease service is provided is not limited to dealer 100. For example, management center 500 may provide the lease service on-line (for example, on the cloud). Only a single type of lease (for example, the partial lease type) may be provided.

Though only the battery is replaced in the embodiment, a battery pack including the battery and accessories thereof (for example, at least one of a battery ECU, the BMS, a temperature adjustment system, and the SMR) may collectively be replaced. The battery data should only be data representing a state of the battery detected by a sensor provided in the battery and is not limited to the data shown in FIG. 2. For example, data on a voltage of the battery may be adopted in addition to the data shown in FIG. 2 or instead of at least one type of data shown in FIG. 2.

The vehicle may be configured to wirelessly be chargeable. The vehicle that carries out wireless charging may be regarded as being in a state in conformity with the "plugged-in state" in contact charging (cable charging) described previously when alignment between a power transmission unit (for example, a power transmission coil) on a side of the power feed facility and a power reception unit (for example, a power reception coil) on a side of the vehicle is completed. The vehicle and the power feed facility may be configured to establish wireless communication (short-range communication).

The vehicle may be an xEV (electrically powered vehicle) other than the BEV. The vehicle may include an internal combustion engine. The vehicle is not limited to a four-wheel passenger car, but may be a bus or a truck, or an xEV with three wheels or at least five wheels. The vehicle may be provided with a solar panel. The vehicle may be configured to be able to autonomous drive or may perform a flying function. The vehicle may be a vehicle (for example, a robo-taxi, an automated guided vehicle, or an agricultural machine) that can travel without human intervention.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A method of managing an electrically powered vehicle comprising:
   obtaining, for an electrically powered vehicle configured to travel with electric power from a battery, battery data representing a state of the battery over a preceding time period detected by a sensor provided in the battery and vehicle behavior data reflecting a behavior of the electrically powered vehicle during travel in the preceding time period;
   assessing an accident risk of the electrically powered vehicle based on the battery data during travel of the electrically powered vehicle; and
   providing a prescribed service based on a result of assessment of the accident risk;
   wherein
   the prescribed service includes an insurance service relating to replacement of the battery,
   the providing a prescribed service includes
      assessing a deterioration risk of the battery by comparing current data, stored power data or temperature data obtained by the sensor provided in the battery with a respective current threshold, stored power threshold or temperature threshold, and
      determining an insurance fee for a period of coverage by the insurance service for a user of the electrically powered vehicle to receive the insurance service based on the accident risk and the deterioration risk assessed based on the battery data during an assessment period set before the period of coverage.

2. The method of managing an electrically powered vehicle according to claim 1, wherein
   the battery data includes data on a temperature of the battery detected by the sensor, and
   the assessing an accident risk includes assessing the accident risk to be related to a period during which the temperature of the battery exceeds a reference value during travel of the electrically powered vehicle, with a shorter period resulting in a lower accident risk.

3. The method of managing an electrically powered vehicle according to claim 1, wherein
   the battery data includes data on a current in the battery detected by the sensor, and
   the assessing an accident risk includes
      obtaining a frequency of hard braking of the electrically powered vehicle based on a rate of a charging current in the battery during travel of the electrically powered vehicle, and
      assessing the accident risk to be related to the obtained frequency of the hard braking, with a lower frequency of hard braking resulting in a lower accident risk.

4. The method of managing an electrically powered vehicle according to claim 1, wherein
   the battery data includes data on a current in the battery detected by the sensor, and
   the assessing an accident risk includes
      obtaining a frequency of acceleration and deceleration of the electrically powered vehicle based on an amount of the current in the battery during travel of the electrically powered vehicle, and
      assessing the accident risk to be related to the obtained frequency of acceleration and deceleration, with a lower frequency of acceleration and deceleration resulting in a lower accident risk.

5. The method of managing an electrically powered vehicle according to claim 1, wherein
   the prescribed service further includes a lease service for rental of the battery, and
   the providing a prescribed service includes
      obtaining a capacity retention rate of the battery based on the battery data, and
      determining a lease fee of the battery for the period of coverage based on the capacity retention rate of the battery and the insurance fee for the period of coverage.

6. The method of managing an electrically powered vehicle according to claim 5, further comprising encouraging the user of the electrically powered vehicle to replace the battery under the insurance service when the capacity retention rate of the battery becomes equal to or lower than a prescribed threshold value.

7. The method of managing an electrically powered vehicle according to claim 1, wherein
   the prescribed service includes a lease service for rental of the battery and an insurance service that compensates for a damage associated with an accident of the electrically powered vehicle, and
   the providing a prescribed service includes
      assessing a value of the battery based on the battery data,
      determining a lease fee for a user of the electrically powered vehicle to receive the lease service based on the value of the battery, and
      determining an insurance fee for the user of the electrically powered vehicle to receive the insurance service based on the accident risk of the electrically powered vehicle.

8. The method of managing an electrically powered vehicle according to claim 1, wherein
the prescribed service further includes a lease service for rental of the electrically powered vehicle including a body and the battery,
the providing a prescribed service includes:
obtaining a capacity retention rate of the battery based on the battery data,
determining a first lease fee of the battery for the period of coverage based on the capacity retention rate of the battery and the insurance fee for the period of coverage,
determining a second lease fee of the body for the period of coverage based on the accident risk, and
determining a vehicle lease fee that is a total amount of the first lease fee and the second lease fee.

9. A computer apparatus comprising:
a processor; and
a storage where a program causing the processor to perform the method of managing an electrically powered vehicle according to claim 1 is stored.

10. A system that manages an electrically powered vehicle comprising:
an electrically powered vehicle configured to travel with electric power from a battery;
a power feed facility that feeds electric power to the electrically powered vehicle; and
the computer apparatus according to claim 9, wherein
the computer apparatus is configured to perform, for the electrically powered vehicle, the method of managing an electrically powered vehicle, and
the electrically powered vehicle is configured to transmit the battery data recorded during travel of the electrically powered vehicle to the computer apparatus by communicating with the computer apparatus through the power feed facility while the electrically powered vehicle is connected to the power feed facility.

* * * * *